US012639485B2

(12) United States Patent
Akiyama et al.

(10) Patent No.: US 12,639,485 B2

(45) Date of Patent: May 26, 2026

(54) EVALUATION APPARATUS, EVALUATION METHOD, AND EVALUATION PROGRAM

(71) Applicant: Tokyo Electron Limited, Tokyo (JP)

(72) Inventors: Daishiro Akiyama, Albany, NY (US);
Yusuke Ogawa, Hokkaido (JP);
Tsuyoshi Mizuuchi, Hokkaido (JP);
Takahiko Kato, Miyagi (JP); Tomoki Komatsu, Tokyo (JP); Kosuke Nakago, Tokyo (JP); Yuhei Otomo, Tokyo (JP);
Kohji Liu, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 1049 days.

(21) Appl. No.: 17/663,297

(22) Filed: May 13, 2022

(65) Prior Publication Data

US 2022/0366092 A1 Nov. 17, 2022

(30) Foreign Application Priority Data

May 14, 2021 (JP) ................................. 2021-082240

(51) Int. Cl.
G06F 30/10 (2020.01)
G06F 30/398 (2020.01)
(Continued)

(52) U.S. Cl.
CPC ............ G06F 30/10 (2020.01); G06F 30/398 (2020.01); G06N 3/126 (2013.01); H10P 74/27 (2026.01); G06F 2113/18 (2020.01)

(58) Field of Classification Search
None
See application file for complete search history.

(56) References Cited

U.S. PATENT DOCUMENTS

2008/0250381 A1* 10/2008 Kotani ................ G03F 7/70525
716/50
2020/0201952 A1* 6/2020 Kim ...................... G06F 30/367
2020/0380362 A1* 12/2020 Cao .......................... G06N 3/04

FOREIGN PATENT DOCUMENTS

JP        2017-135365        8/2017
WO        2020/050072        3/2020
WO        WO-2020050072 A1 * 3/2020 ............. H01L 21/00

OTHER PUBLICATIONS

H.-C. Shao et al., "From IC Layout to Die Photograph: A CNN-Based Data-Driven Approach," in IEEE Transactions on Computer-Aided Design of Integrated Circuits and Systems, vol. 40, No. 5, pp. 957-970, 2020 (Year: 2020).*

* cited by examiner

*Primary Examiner* — Kamini S Shah
(74) *Attorney, Agent, or Firm* — IPUSA, PLLC

(57) ABSTRACT

An evaluation apparatus includes a processor that performs operations including reading a simulation parameter of a topography simulator and first range information or second range information that are associated with each other, the simulation parameter being calculated to cause the topography simulator output topography information of a processed target object that is to be obtained by processing the unprocessed target object under a predetermined processing condition, providing topography information of a new unprocessed target object and the simulation parameter to the topography simulator to cause the topography simulator to predict topography information of a new processed target object that is processed under the predetermined processing condition, and outputting a result of comparing the topography information of the new unprocessed target object with the first range information or a result of comparing the (Continued)

topography information of the new processed target object with the second range information.

12 Claims, 15 Drawing Sheets

(51) Int. Cl.
*G06N 3/126*  (2023.01)
*H10P 74/00*  (2026.01)
*G06F 113/18*  (2020.01)

FIG.2

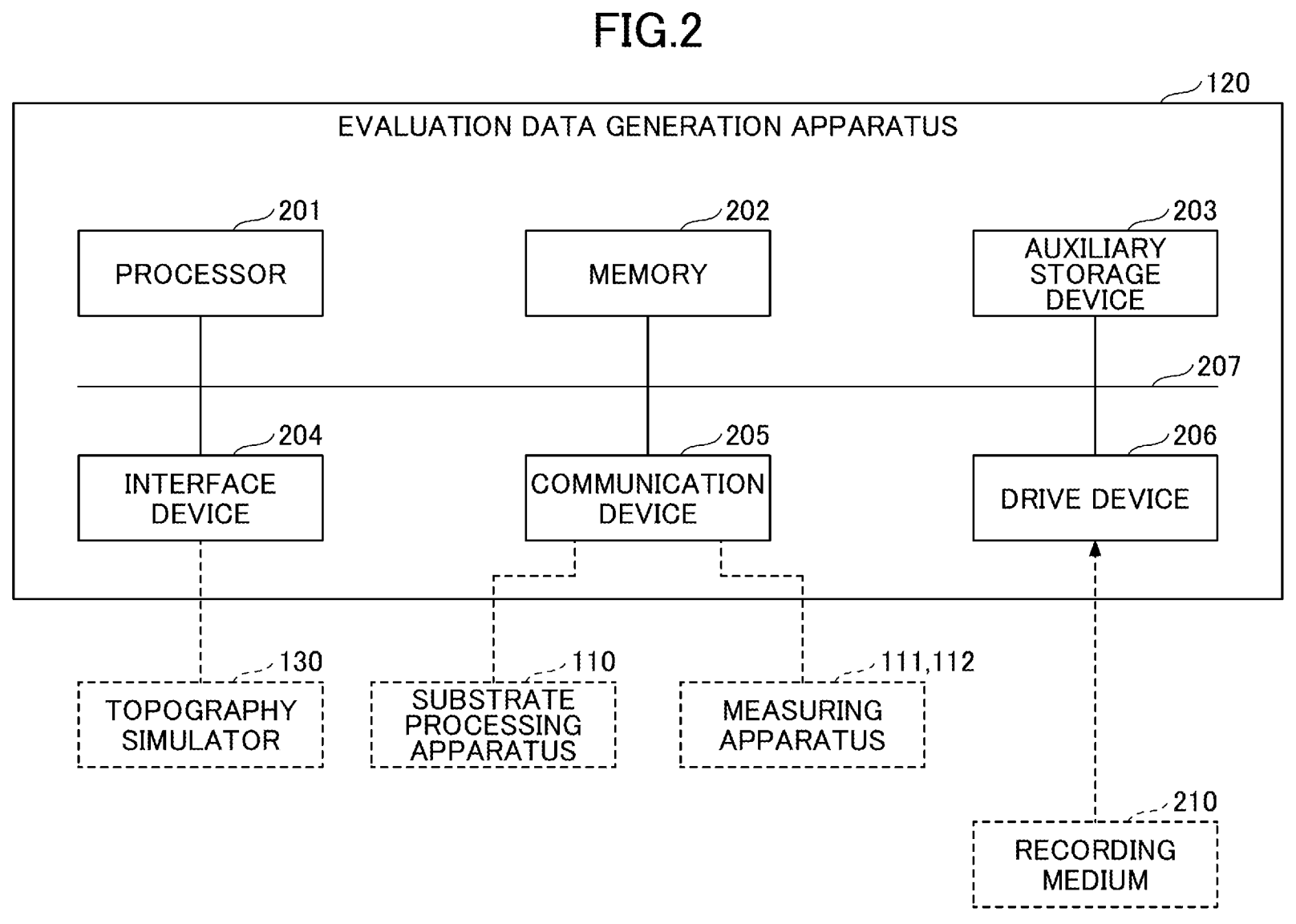

EVALUATION DATA GENERATION APPARATUS — 120

PROCESSOR — 201

MEMORY — 202

AUXILIARY STORAGE DEVICE — 203

INTERFACE DEVICE — 204

COMMUNICATION DEVICE — 205

DRIVE DEVICE — 206

207

TOPOGRAPHY SIMULATOR — 130

SUBSTRATE PROCESSING APPARATUS — 110

MEASURING APPARATUS — 111,112

RECORDING MEDIUM — 210

Figure 6:
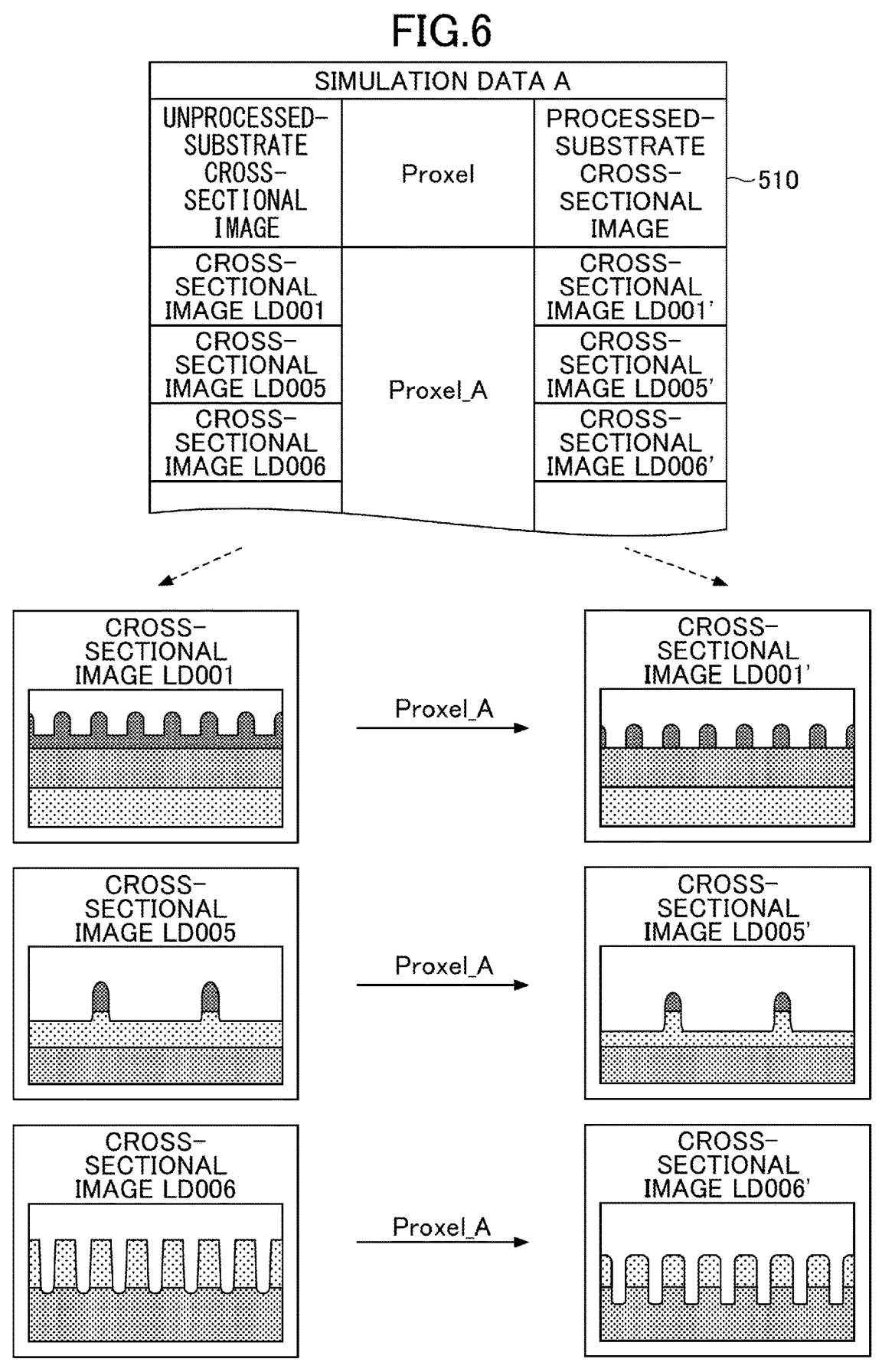

| SIMULATION DATA A | | |
|---|---|---|
| UNPROCESSED-SUBSTRATE CROSS-SECTIONAL IMAGE | Proxel | PROCESSED-SUBSTRATE CROSS-SECTIONAL IMAGE |
| CROSS-SECTIONAL IMAGE LD001 | | CROSS-SECTIONAL IMAGE LD001' |
| CROSS-SECTIONAL IMAGE LD005 | Proxel_A | CROSS-SECTIONAL IMAGE LD005' |
| CROSS-SECTIONAL IMAGE LD006 | | CROSS-SECTIONAL IMAGE LD006' |
| | | |

~510

CROSS-SECTIONAL IMAGE LD001    Proxel_A →    CROSS-SECTIONAL IMAGE LD001'

CROSS-SECTIONAL IMAGE LD005    Proxel_A →    CROSS-SECTIONAL IMAGE LD005'

CROSS-SECTIONAL IMAGE LD006    Proxel_A →    CROSS-SECTIONAL IMAGE LD006'

FIG.8

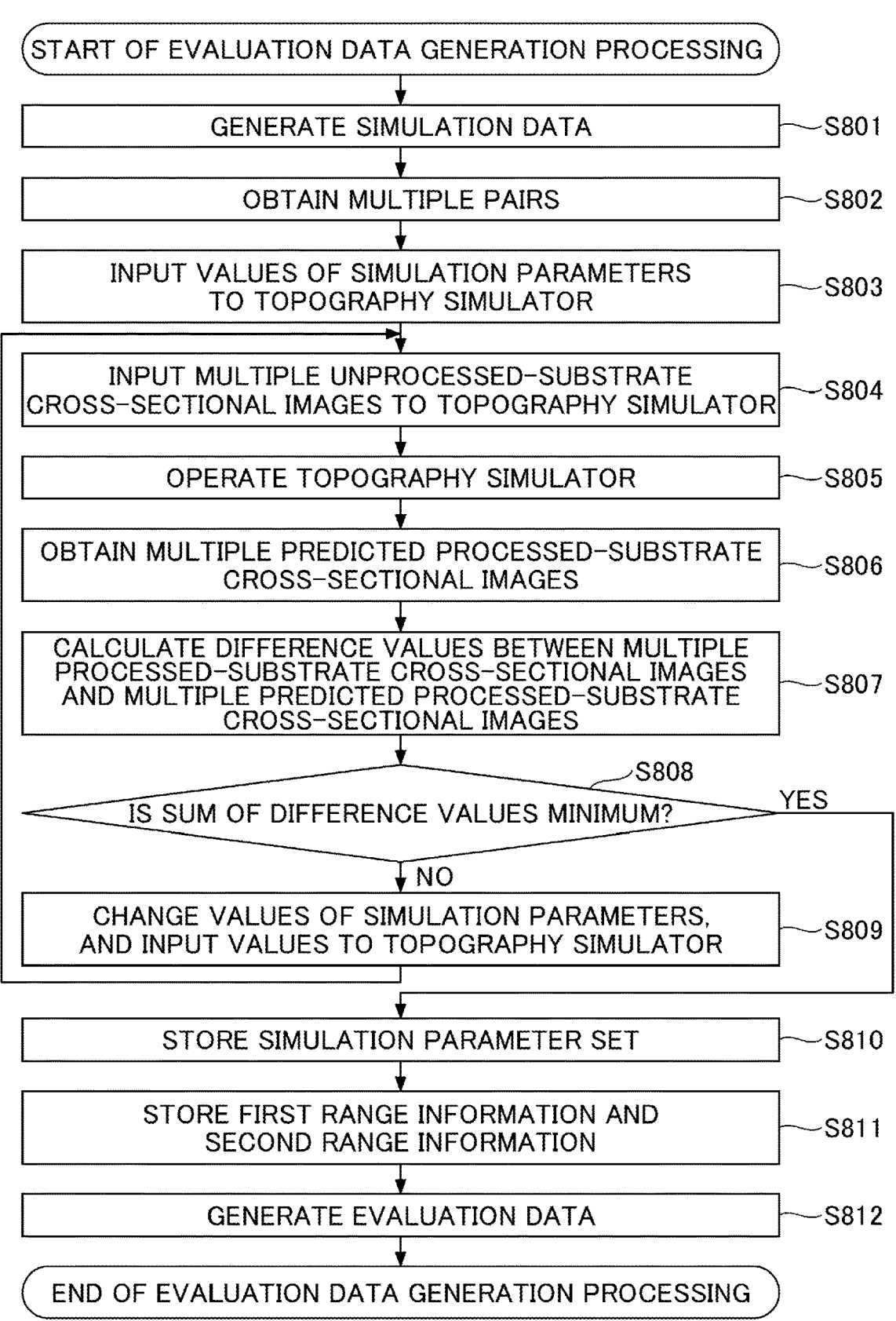

START OF EVALUATION DATA GENERATION PROCESSING

GENERATE SIMULATION DATA — S801

OBTAIN MULTIPLE PAIRS — S802

INPUT VALUES OF SIMULATION PARAMETERS TO TOPOGRAPHY SIMULATOR — S803

INPUT MULTIPLE UNPROCESSED-SUBSTRATE CROSS-SECTIONAL IMAGES TO TOPOGRAPHY SIMULATOR — S804

OPERATE TOPOGRAPHY SIMULATOR — S805

OBTAIN MULTIPLE PREDICTED PROCESSED-SUBSTRATE CROSS-SECTIONAL IMAGES — S806

CALCULATE DIFFERENCE VALUES BETWEEN MULTIPLE PROCESSED-SUBSTRATE CROSS-SECTIONAL IMAGES AND MULTIPLE PREDICTED PROCESSED-SUBSTRATE CROSS-SECTIONAL IMAGES — S807

IS SUM OF DIFFERENCE VALUES MINIMUM? — S808    YES

NO

CHANGE VALUES OF SIMULATION PARAMETERS, AND INPUT VALUES TO TOPOGRAPHY SIMULATOR — S809

STORE SIMULATION PARAMETER SET — S810

STORE FIRST RANGE INFORMATION AND SECOND RANGE INFORMATION — S811

GENERATE EVALUATION DATA — S812

END OF EVALUATION DATA GENERATION PROCESSING

FIG.11

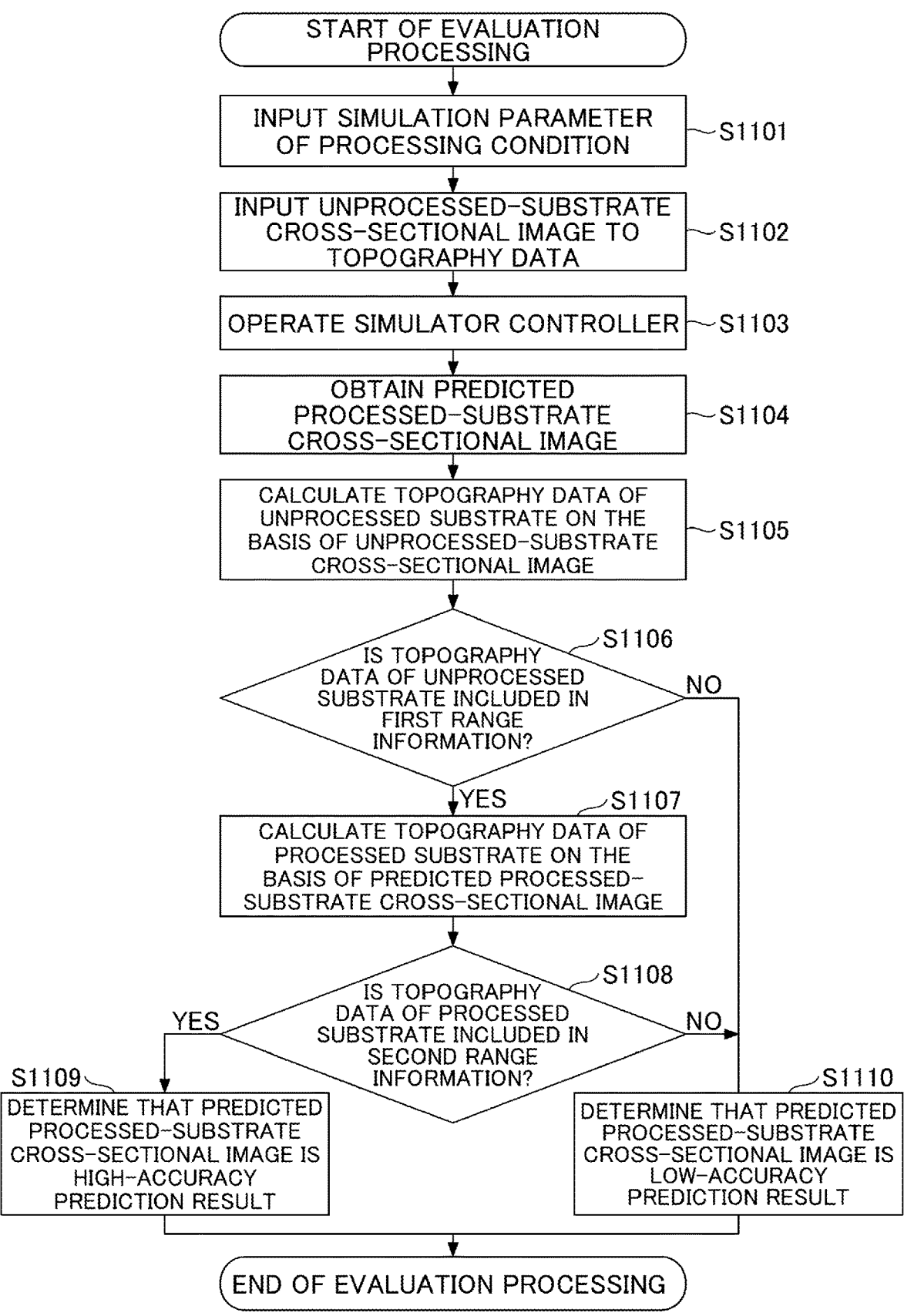

START OF EVALUATION PROCESSING

INPUT SIMULATION PARAMETER OF PROCESSING CONDITION ~S1101

INPUT UNPROCESSED-SUBSTRATE CROSS-SECTIONAL IMAGE TO TOPOGRAPHY DATA ~S1102

OPERATE SIMULATOR CONTROLLER ~S1103

OBTAIN PREDICTED PROCESSED-SUBSTRATE CROSS-SECTIONAL IMAGE ~S1104

CALCULATE TOPOGRAPHY DATA OF UNPROCESSED SUBSTRATE ON THE BASIS OF UNPROCESSED-SUBSTRATE CROSS-SECTIONAL IMAGE ~S1105

IS TOPOGRAPHY DATA OF UNPROCESSED SUBSTRATE INCLUDED IN FIRST RANGE INFORMATION? S1106   NO

YES   S1107

CALCULATE TOPOGRAPHY DATA OF PROCESSED SUBSTRATE ON THE BASIS OF PREDICTED PROCESSED-SUBSTRATE CROSS-SECTIONAL IMAGE

IS TOPOGRAPHY DATA OF PROCESSED SUBSTRATE INCLUDED IN SECOND RANGE INFORMATION? S1108

YES   NO

S1109

DETERMINE THAT PREDICTED PROCESSED-SUBSTRATE CROSS-SECTIONAL IMAGE IS HIGH-ACCURACY PREDICTION RESULT

S1110

DETERMINE THAT PREDICTED PROCESSED-SUBSTRATE CROSS-SECTIONAL IMAGE IS LOW-ACCURACY PREDICTION RESULT

END OF EVALUATION PROCESSING

FIG.15

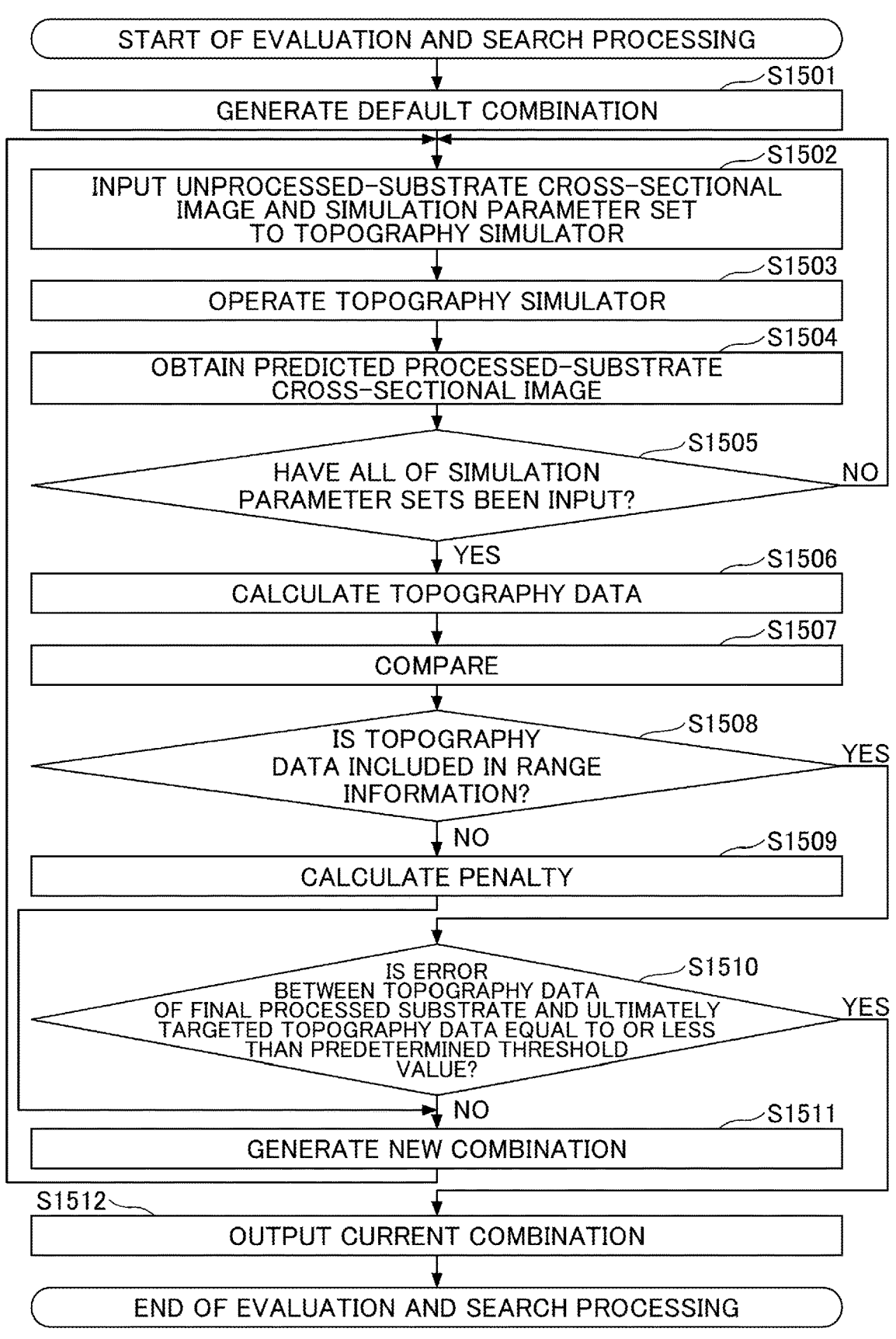

START OF EVALUATION AND SEARCH PROCESSING

S1501
GENERATE DEFAULT COMBINATION

S1502
INPUT UNPROCESSED-SUBSTRATE CROSS-SECTIONAL
IMAGE AND SIMULATION PARAMETER SET
TO TOPOGRAPHY SIMULATOR

S1503
OPERATE TOPOGRAPHY SIMULATOR

S1504
OBTAIN PREDICTED PROCESSED-SUBSTRATE
CROSS-SECTIONAL IMAGE

S1505
HAVE ALL OF SIMULATION
PARAMETER SETS BEEN INPUT?     NO

YES
S1506
CALCULATE TOPOGRAPHY DATA

S1507
COMPARE

S1508
IS TOPOGRAPHY
DATA INCLUDED IN RANGE
INFORMATION?     YES

NO     S1509
CALCULATE PENALTY

S1510
IS ERROR
BETWEEN TOPOGRAPHY DATA
OF FINAL PROCESSED SUBSTRATE AND ULTIMATELY
TARGETED TOPOGRAPHY DATA EQUAL TO OR LESS
THAN PREDETERMINED THRESHOLD
VALUE?     YES

NO     S1511
GENERATE NEW COMBINATION

S1512
OUTPUT CURRENT COMBINATION

END OF EVALUATION AND SEARCH PROCESSING

EVALUATION APPARATUS, EVALUATION METHOD, AND EVALUATION PROGRAM

CROSS-REFERENCE TO RELATED APPLICATION

The present application is based on and claims priority to Japanese Priority Application No. 2021-082240 filed on May 14, 2021, the entire contents of which are hereby incorporated herein by reference.

BACKGROUND OF THE INVENTION

1. Field of the Invention

The present disclosure relates to an evaluation apparatus, an evaluation method, and an evaluation program.

2. Description of the Related Art

In general, in the field of substrate processing apparatuses, a topography simulator is used to predict a topography of a substrate that is expected to be obtained after the substrate has been processed. The topography simulator is an apparatus for predicting a topography of a substrate that is processed under a predetermined processing condition.

SUMMARY OF THE INVENTION

An evaluation apparatus according to an embodiment of the present disclosure includes a processor and a memory storing instructions that, when executed by the processor, perform operations including reading, from a storage, a simulation parameter of a topography simulator and first range information or second range information that are associated with each other, the simulation parameter of the topography simulator being calculated so that the topography simulator outputs, in response to topography information of an unprocessed target object being input to the topography simulator, topography information similar to topography information of a processed target object that is to be obtained by processing the unprocessed target object under a predetermined processing condition, the first range information indicating a topography range that is deemed to be the same as a topography of the unprocessed target object, and the second range information indicating a topography range that is deemed to be the same as a topography of the processed target object, providing topography information of a new unprocessed target object and the simulation parameter to the topography simulator to cause the topography simulator to predict topography information of a new processed target object that is to be obtained by processing the new unprocessed target object under the predetermined processing condition, and outputting a result of comparing the topography information of the new unprocessed target object with the first range information or a result of comparing the topography information of the new processed target object with the second range information.

BRIEF DESCRIPTION OF THE DRAWINGS

FIG. 2 is a diagram illustrating an example of a hardware configuration of an evaluation data generation apparatus;

FIG. 4 is a diagram illustrating an example of functional configuration of the evaluation data generation apparatus;

FIG. 5 is a diagram illustrating a specific example of processing of a simulation data generation unit;

FIG. 6 is a diagram illustrating a specific example of simulation data stored in a simulation data storage unit;

FIG. 8 is a flowchart illustrating a flow of evaluation data generation processing;

FIG. 11 is a flowchart illustrating a flow of evaluation processing of an evaluation apparatus;

FIG. 15 is a flowchart illustrating a flow of evaluation and search processing performed by the evaluation apparatus.

DETAILED DESCRIPTION OF THE PREFERRED EMBODIMENTS

Figure 1:
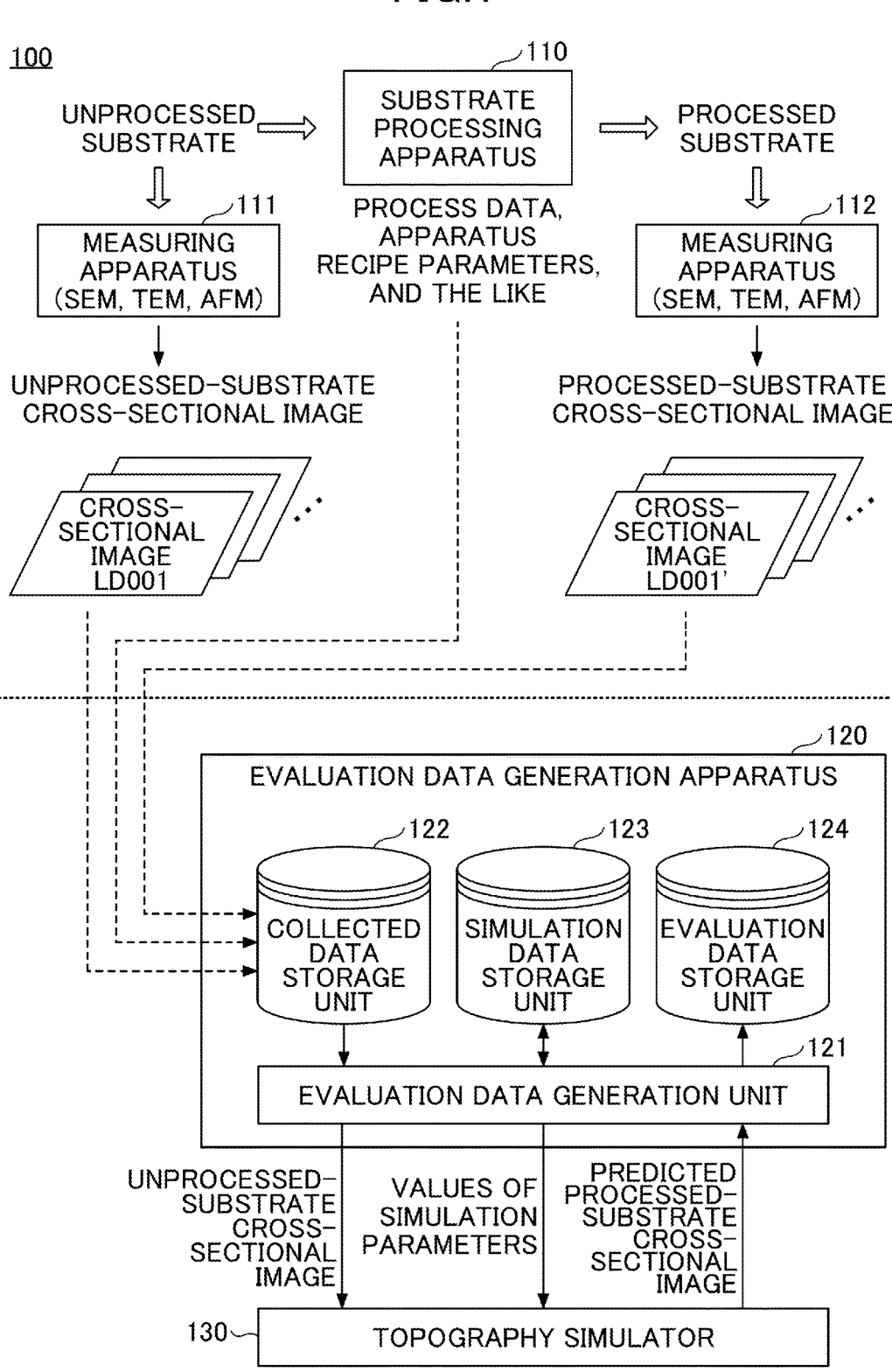
FIG. 1 is a diagram illustrating an example of a system configuration in an evaluation data generation phase of a topography simulation system.

In general, in the field of substrate processing apparatuses, a topography simulator is used to predict a topography of a substrate that is expected to be obtained after the substrate has been processed. The topography simulator is an apparatus for predicting a topography of a substrate that is processed under a predetermined processing condition.

When a user uses the topography simulator, the user derives simulation parameters in advance according to the predetermined processing condition on the basis of a relationship between topographies of multiple unprocessed substrates and topographies of multiple processed substrates under the predetermined processing condition. Then, the user runs the topography simulator by using the simulation parameters derived in advance, so that the user obtains a prediction result predicting a topography of a new substrate that is expected to be obtained after the new substrate is processed under the predetermined processing condition (for example, see Japanese Laid-Open Patent Application Publication No 2017-135365).

However, when the user uses, as a new substrate, a substrate of which the topography is greatly different from the topography of the substrate used for deriving the simulation parameters, the accuracy of the prediction result of the above-described topography simulator decreases.

Therefore, when the above-described topography simulator is used, it is required to objectively evaluate the prediction result.

Accordingly, it is desired to provide an evaluation apparatus, an evaluation method, and an evaluation program for evaluating a prediction result predicted by the topography simulator.

Hereinafter, embodiments are described with reference to the attached drawings. In the present specification and drawings, components having substantially the same functionals are denoted with the same reference numerals, and duplicate description thereabout is omitted. In the present disclosure, a substrate processing process is explained, but the substrate processing process is merely an example, and the present disclosure is not limited thereto.

First Embodiment

First, an overview of a topography simulation system to which an evaluation apparatus according to the first embodiment is applied is explained. The topography simulation system is a system including a topography simulator. In the first embodiment, the topography simulation system executes processing in an evaluation data generation phase and processing in an evaluation phase.

Processing in an evaluation data generation phase executed by the topography simulation system refers to processing for generating evaluation data in which:

simulation parameters used to operate the topography simulator; and range information indicating a predetermined topography range used to evaluate a prediction result predicted by the topography simulator, are associated with each other.

Processing in the evaluation phase of the topography simulation system refers to processing for:

operating a topography simulator with respect to a new substrate using the simulation parameters included in the generated evaluation data; and evaluating a prediction result predicted by the topography simulator by using the range information included in the generated evaluation data.

In the following explanation about the details of the topography simulation system, the evaluation data generation phase and the evaluation phase are explained separately.

System Configuration (Evaluation Data Generation Phase) of Topography Simulation System First, a system configuration of the entirety of the topography simulation system in the evaluation data generation phase is explained. FIG. 1 is a diagram illustrating an example of a system configuration in the evaluation data generation phase of the topography simulation system.

As illustrated in FIG. 1, in the evaluation data generation phase, the topography simulation system 100 includes a substrate processing apparatus 110, measuring apparatuses 111, 112, an evaluation data generation apparatus 120, and a topography simulator 130.

In FIG. 1, multiple unprocessed substrates (target objects) are conveyed to the substrate processing apparatus 110, and the substrate processing apparatus 110 executes various substrate processing processes (for example, dry etching, deposition, and the like).

Some of multiple unprocessed substrates are conveyed to the measuring apparatus 111, and are cut at various positions in a cross-sectional direction. Thereafter, the measuring apparatus 111 measures cross-sectional topographies of the unprocessed substrates. Accordingly, the measuring apparatus 111 generates unprocessed-substrate cross-sectional images indicating cross-sectional topographies of unprocessed substrates. The measuring apparatus 111 may include a scanning electron microscope (SEM), a transmission electron microscope (TEM), an atomic force microscope (AFM), or the like.

The example of FIG. 1 shows that the measuring apparatus 111 generates unprocessed-substrate cross-sectional images having file names such as "cross-sectional image LD001", "cross-sectional image LD002", "cross-sectional image LD003", and the like.

When various substrate processing processes are executed, processed substrates are conveyed out of the substrate processing apparatus 110. At this occasion, the substrate processing apparatus 110 stores processing conditions (process data obtained while various substrate processing processes are executed, recipe parameters used to execute various substrate processing processes, and the like).

Some of multiple processed substrates conveyed out of the substrate processing apparatus 110 are conveyed to the measuring apparatus 112, and are cut at various positions in a cross-sectional direction. Thereafter, the measuring apparatus 112 measures the cross-sectional topographies. Accordingly, the measuring apparatus 112 generates processed-substrate cross-sectional images indicating cross-sectional topographies of the processed substrates. Similar to the measuring apparatus 111, the measuring apparatus 112 may include a scanning electron microscope (SEM), a transmission electron microscope (TEM), an atomic force microscope (AFM), or the like.

The example of FIG. 1 shows that the measuring apparatus 112 generates processed-substrate cross-sectional images having file names such as "cross-sectional image LD001'", "cross-sectional image LD002'", "cross-sectional image LD003'", and the like.

The unprocessed-substrate cross-sectional images generated by the measuring apparatus 111; process data, recipe parameters, and the like stored by the substrate processing apparatus 110; and the processed-substrate cross-sectional image generated by the measuring apparatus 112 are transmitted as collected data to the evaluation data generation apparatus 120. Accordingly, a collected data storage unit 122 of the evaluation data generation apparatus 120 stores the collected data.

The evaluation data generation program is installed in the evaluation data generation apparatus 120, and when the program is executed, the evaluation data generation apparatus 120 functions as an evaluation data generation unit 121.

The evaluation data generation unit 121 reads the collected data stored in the collected data storage unit 122, and generates simulation data that is used when the topography simulator 130 is operated. In addition, the evaluation data generation unit 121 stores the generated simulation data to a simulation data storage unit 123.

The simulation data includes multiple pairs of cross-sectional images, each pair being constituted by an unprocessed-substrate cross-sectional image and a processed-substrate cross-sectional image, included in the collected data, and is classified and managed for each group of processing conditions (process data, recipe parameters, and the like) under which the same effect can be obtained from a change of a cross-sectional topography before and after the processing.

In the present embodiment, a group of processing conditions (process data, recipe parameters, and the like) under which the same effect can be obtained from a change of a cross-sectional topography before and after the processing is referred to as "Proxel", which is a concept indicating a minimum data unit of microfabrication in the substrate processing process. However, "the same effect" used herein does not require the change of the cross-sectional topography to be exactly the same, and means that the change of the cross-sectional topography is substantially the same (i.e., within a predetermined range).

The evaluation data generation unit 121 reads multiple pairs of cross-sectional images, each pair being constituted by an unprocessed-substrate cross-sectional image and a processed-substrate cross-sectional image, included in simulation data of a particular Proxel from among simulation data classified according to Proxels.

Furthermore, the evaluation data generation unit 121 inputs the unprocessed-substrate cross-sectional images included in the multiple read pairs into the topography simulator 130 and obtains the predicted processed-substrate cross-sectional images from the topography simulator 130.

In this case, when the topography simulator 130 is operated, the evaluation data generation unit 121 repeatedly inputs the unprocessed-substrate cross-sectional images into the topography simulator 130 while changing the values of the simulation parameters.

Then, the evaluation data generation unit 121 changes the values of the simulation parameter such that the predicted processed-substrate cross-sectional images repeatedly output from the topography simulator 130 become closer to the corresponding processed-substrate cross-sectional images.

Accordingly, the evaluation data generation unit 121 can derive the optimum values of the simulation parameter that can minimize a sum of difference values between the predicted processed-substrate cross-sectional images and the corresponding processed-substrate cross-sectional images.

Furthermore, the evaluation data generation unit 121 generates evaluation data, and stores the evaluation data to an evaluation data storage unit 124 that is an example of a storage unit. Specifically, the evaluation data generation unit 121 generates evaluation data by associating:

a simulation parameter set constituted by the derived optimum values of the simulation parameters;

the above-described particular Proxel associated with the simulation data used to derive the optimum values of the simulation parameter;

first range information indicating a range of topography data of unprocessed-substrate cross-sectional images included in simulation data of the above-described particular Proxel (i.e., information indicating a topography range that is deemed as the same topography); and second range information indicating a range of topography data of processed-substrate cross-sectional images included in simulation data of the above-described particular Proxel (i.e., information indicating a topography range that is deemed as the same topography), and stores the evaluation data to the evaluation data storage unit 124. In this case, the range information may be set using one or multiple pieces of topography data. For example, the range information may be expressed as a predetermined range with reference to one or multiple pieces of topography data.

The topography simulator 130 operates by receiving the unprocessed-substrate cross-sectional image and the values of the simulation parameter from the evaluation data generation unit 121, and outputs the predicted processed-substrate cross-sectional images.

Hardware Configuration of Evaluation Data Generation Apparatus

Next, a hardware configuration of the evaluation data generation apparatus 120 is explained. FIG. 2 is a diagram illustrating an example of a hardware configuration of the evaluation data generation apparatus 120.

As illustrated in FIG. 2, the evaluation data generation apparatus 120 includes a processor 201, a memory 202, an auxiliary storage device 203, an interface (I/F) device 204, a communication device 205, and a drive device 206. Note that hardware components of the evaluation data generation apparatus 120 are mutually coupled via a bus 207.

The processor 201 includes various arithmetic devices including a central processing unit (CPU), a graphics processing unit (GPU), and the like. The processor 201 reads various programs (for example, an evaluation data generation program) onto the memory 202, to thereby execute the programs.

The memory 202 includes a main storage such as a read only memory (ROM) or a random access memory (RAM). The processor 201 and the memory 202 constitute a computer. When the processor 201 retrieves various programs from the memory 202 to thereby execute the programs, the computer implements various functions.

The auxiliary storage device 203 stores various programs and various data to be used when the processor 201 executes the programs. For example, the collected data storage unit 122, the simulation data storage unit 123, and the evaluation data storage unit 124 explained above are implemented by the auxiliary storage device 203.

The interface device 204 is a communication device for connecting the topography simulator 130, which is an example of an external apparatus, and the evaluation data generation apparatus 120.

The communication device 205 is a communication device for communicating via a network with the substrate processing apparatus 110, the measuring apparatuses 111, 112, and the like.

The drive device 206 is used to set a recording medium 210. For example, the recording medium 210 may include a medium for optically, electrically, or magnetically recording information such as a CD-ROM, a flexible disk, a magneto-optical disk, or the like. The recording medium 210 may also include a semiconductor memory or the like that electrically records information such as a read only memory (ROM), a flash memory, or the like.

The user may install various programs to the auxiliary storage device 203 by, for example, setting the provided recording medium 210 in the drive device 206 to cause the drive device 206 to read various programs recorded in the recording medium 210. Alternatively, the user may install various programs to the auxiliary storage device 203 by downloading various programs via the communication device 205 from the network.

Specific Example of Collected Data

Figure 3:
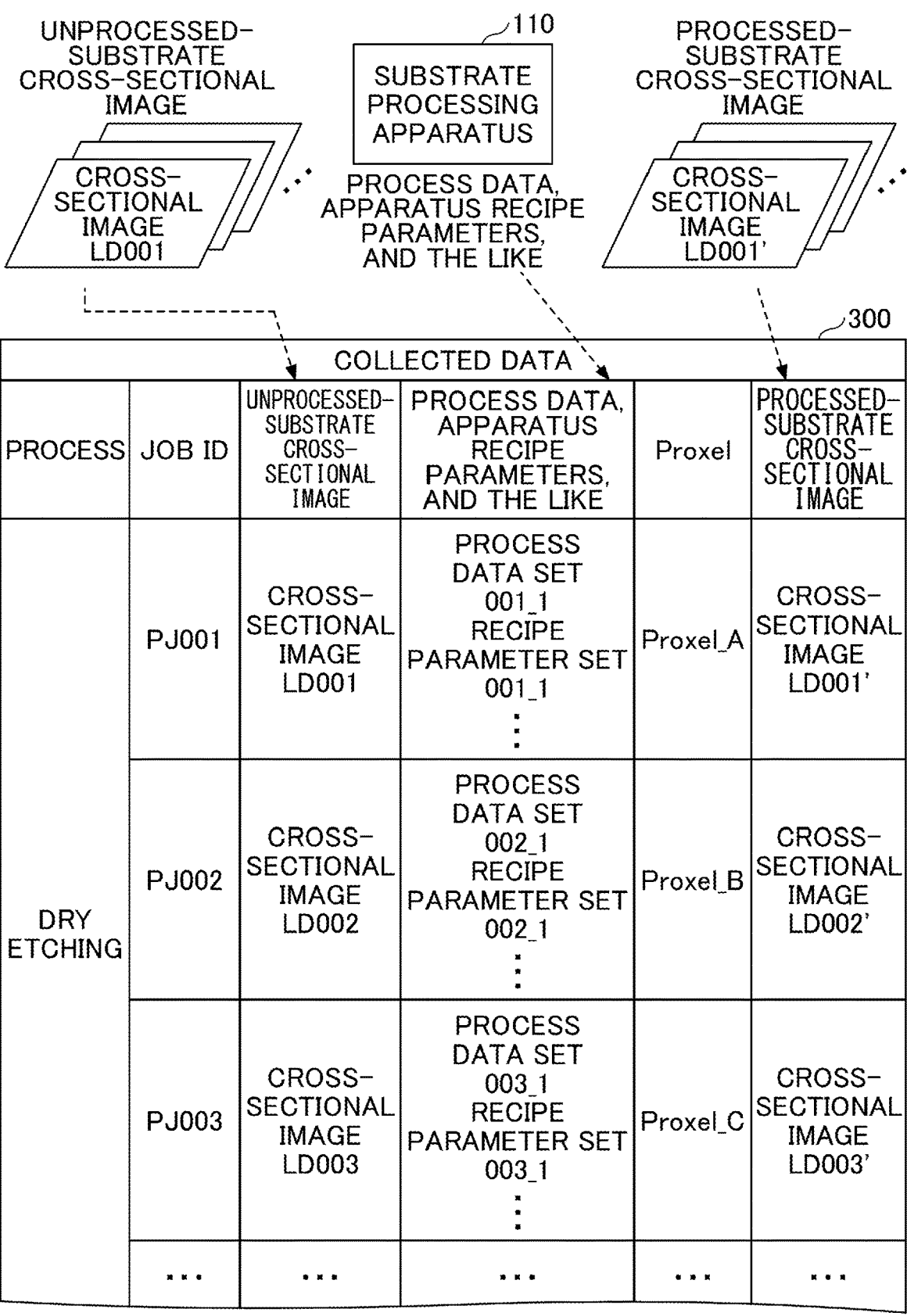
FIG. 3 is a diagram illustrating an example of collected data stored in a collected data storage unit.

Next, a specific example of collected data stored in the collected data storage unit 122 is explained. FIG. 3 is a diagram illustrating an example of collected data stored in the collected data storage unit 122.

As illustrated in FIG. 3, the collected data 300 includes, as items of information, "process", "job ID", "unprocessed-substrate cross-sectional image", "process data, recipe parameters, and the like", "Proxel", "processed-substrate cross-sectional image".

The item "process" stores the name indicating a substrate processing process. The example of FIG. 3 shows that "dry etching" is stored in the item "process".

The item "job ID" is an identifier for identifying a job to be executed by the substrate processing apparatus 110.

The example of FIG. 3 shows that "PJ001", "PJ002", and "PJ003" are stored in the items "job IDs" of the dry etching.

The item "unprocessed-substrate cross-sectional image" stores a file name of an unprocessed-substrate cross-sectional image generated by the measuring apparatus 111. In the example of FIG. 3, when the job ID="PJ001", the measuring apparatus 111 generates an unprocessed-substrate cross-sectional image with a file name="cross-sectional image LD001" with respect to one of the unprocessed substrates in a lot (a substrate group) of the job in question.

In the example of FIG. 3, when the job ID="PJ002", the measuring apparatus 111 generates an unprocessed-substrate cross-sectional image with a file name="cross-sectional image LD002" with respect to one of the unprocessed substrates in the lot (the substrate group) of the job in question. Furthermore, in the example of FIG. 3, when the job ID="PJ003", the measuring apparatus 111 generates an unprocessed-substrate cross-sectional image with a file name="cross-sectional image LD003" with respect to one of the unprocessed substrates in the lot (the substrate group) of the job in question.

The item "process data, recipe parameters, and the like" stores processing conditions (process data, recipe parameters, and the like) stored by the substrate processing apparatus 110. In the example of FIG. 3, the "process data set 001_1" and the like include, for example, process data such as:

data that is output from the substrate processing apparatus 110 during processing, such as Vpp (potential difference), Vdc (DC self-bias voltage), OES (light intensity by inductively coupled plasma optical emission spectrometer), Reflect (reflected power), Top DCS current (detected value of doppler velocimeter), and the like; and data measured during processing, such as plasma density, ion energy, ion flux, and the like.

In the example of FIG. 3, the "recipe parameter set 001_1" and the like include, for example, recipe parameters such as:

data that is set as setting values of the substrate processing apparatus 110, such as Pressure (pressure in chamber), Power (power of radio frequency power supply), Gas (gas flow rate), Temperature (temperature in chamber or surface temperature of substrate), and the like. Also, the "recipe parameter set 001_1" and the like may include, as parameters other than the recipe parameters, target value parameters such as:

data that is set as the target values in the substrate processing apparatus 110, such as CD (critical dimensions), Depth, Taper (taper angle), Tilting (tilt angle), Bowing, and the like.

The item "Proxel" stores a Proxel name of a group in which the process data (included in the process data set) and the recipe parameters (included in the recipe parameter set) stored in the item "process data, recipe parameters, and the like" and the like are classified. In the example of FIG. 3, the process data, recipe parameters, and the like corresponding to the job IDs="PJ001", "PJ002", and "PJ003" are classified in "Proxel_A", "Proxel_B", and "Proxel_C", respectively.

The item "processed-substrate cross-sectional image" stores a file name of a processed-substrate cross-sectional image generated by the measuring apparatus 112. In the example of FIG. 3, in the case of the job ID="PJ001", the measuring apparatus 112 generates a processed-substrate cross-sectional image with a file name="cross-sectional image LD001'" with respect to one of the processed substrates in a lot (a substrate group) of the job in question.

In the example of FIG. 3, in the case of the job ID="PJ002", the measuring apparatus 112 generates a processed-substrate cross-sectional image with a file name="cross-sectional image LD002'" with respect to one of the processed substrates in the lot (the substrate group) of the job in question. Furthermore, in the example of FIG. 3, in the case of the job ID="PJ003", the measuring apparatus 111 generates a processed-substrate cross-sectional image with a file name="cross-sectional image LD003'" with respect to one of the processed substrates in the lot (the substrate group) of the job in question.

Functional Configuration of Evaluation Data Generation Apparatus

Figure 4:
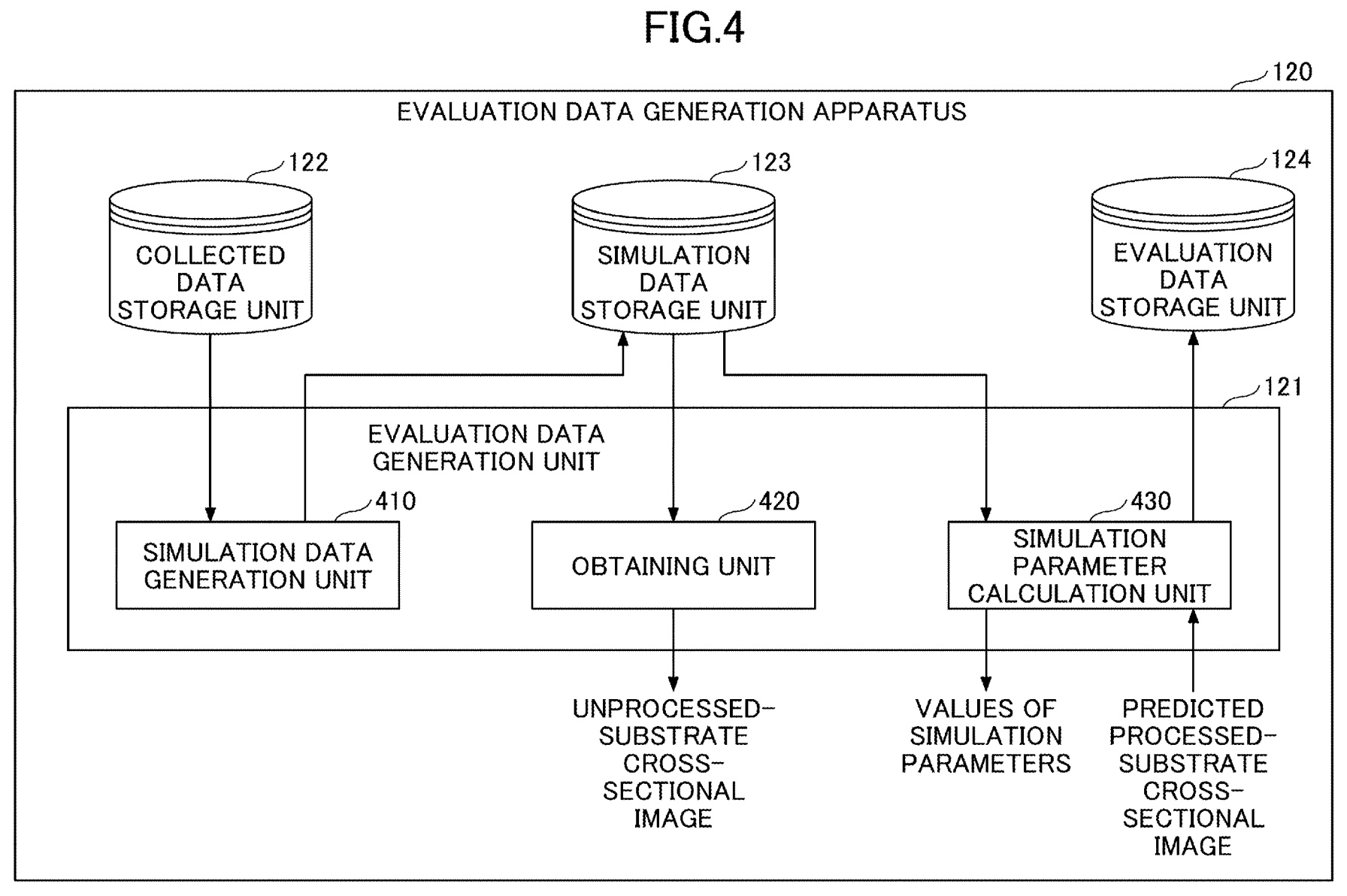

Next, the details of the functional configuration of the evaluation data generation apparatus 120 are explained. FIG. 4 is a diagram illustrating an example of functional configuration of the evaluation data generation apparatus 120. As illustrated in FIG. 4, the evaluation data generation unit 121 of the evaluation data generation apparatus 120 includes:

a simulation data generation unit 410;

an obtaining unit 420; and a simulation parameter calculation unit 430.

The simulation data generation unit 410 reads collected data stored in the collected data storage unit 122, and after the simulation data is generated, the simulation data generation unit 410 stores the generated simulation data to the simulation data storage unit 123. The simulation data generation unit 410 generates simulation data for each of the Proxels.

The obtaining unit 420 reads, from the simulation data storage unit 123, multiple unprocessed-substrate cross-sectional images from among multiple pairs of cross-sectional images, each pair being constituted by an unprocessed-substrate cross-sectional image and a processed-substrate cross-sectional image, included in the simulation data of a particular Proxel.

Furthermore, the obtaining unit 420 inputs the multiple read unprocessed-substrate cross-sectional images to the topography simulator 130 to operate the topography simulator 130.

The simulation parameter calculation unit 430 calculates the values of the simulation parameter that are input to the topography simulator 130. First, the simulation parameter calculation unit 430 inputs the default values of the simulation parameter to the topography simulator 130.

Next, the obtaining unit 420 inputs the multiple unprocessed-substrate cross-sectional images, and the simulation parameter calculation unit 430 obtains multiple predicted processed-substrate images that are output from the topography simulator 130. Also, the simulation parameter calculation unit 430 reads multiple corresponding processed-substrate cross-sectional images, calculates difference values between the obtained predicted processed-substrate cross-sectional images and the corresponding processed-substrate cross-sectional images, and changes the values of the simulation parameter so as to minimize the sum of calculated difference values. Furthermore, the simulation parameter calculation unit 430 inputs the changed values of the simulation parameter into the topography simulator 130.

The simulation parameter calculation unit 430 repeats the processing until the sum of difference values is minimized to operate the topography simulator 130 multiple times.

Furthermore, the simulation parameter calculation unit 430 stores, to the evaluation data storage unit 124, a simulation parameter set constituted by the values of the simulation parameter when the sum of difference values is minimized, as the optimum simulation parameter set.

Furthermore, the simulation parameter calculation unit 430 reads, from the simulation data storage unit 123, a Proxel associated with the simulation data used to derive the optimum simulation parameter set. Also, the simulation parameter calculation unit 430 stores the read Proxel, in association with the optimum simulation parameter set, in the evaluation data storage unit 124.

Furthermore, the simulation parameter calculation unit 430 calculates the topography data of multiple unprocessed-substrate cross-sectional images included in the simulation data used to derive the optimum simulation parameter set. Then, the simulation parameter calculation unit 430 stores first range information indicating a range of each piece of topography data, in association with the optimum simulation parameter set, in the evaluation data storage unit 124.

Furthermore, the simulation parameter calculation unit 430 calculates the topography data of multiple processed-substrate cross-sectional images included in the simulation data used to derive the optimum simulation parameter set. Then, the simulation parameter calculation unit 430 stores second range information indicating a range of each piece of topography data, in association with the optimum simulation parameter set, in the evaluation data storage unit 124.

Specific Example of Processing Performed by Each Unit of Evaluation Data Generation Unit Next, a specific example of processing performed by each unit of the evaluation data generation unit 121 (i.e., the simulation data generation unit 410 and the simulation parameter calculation unit 430) is explained.

Figure 5:
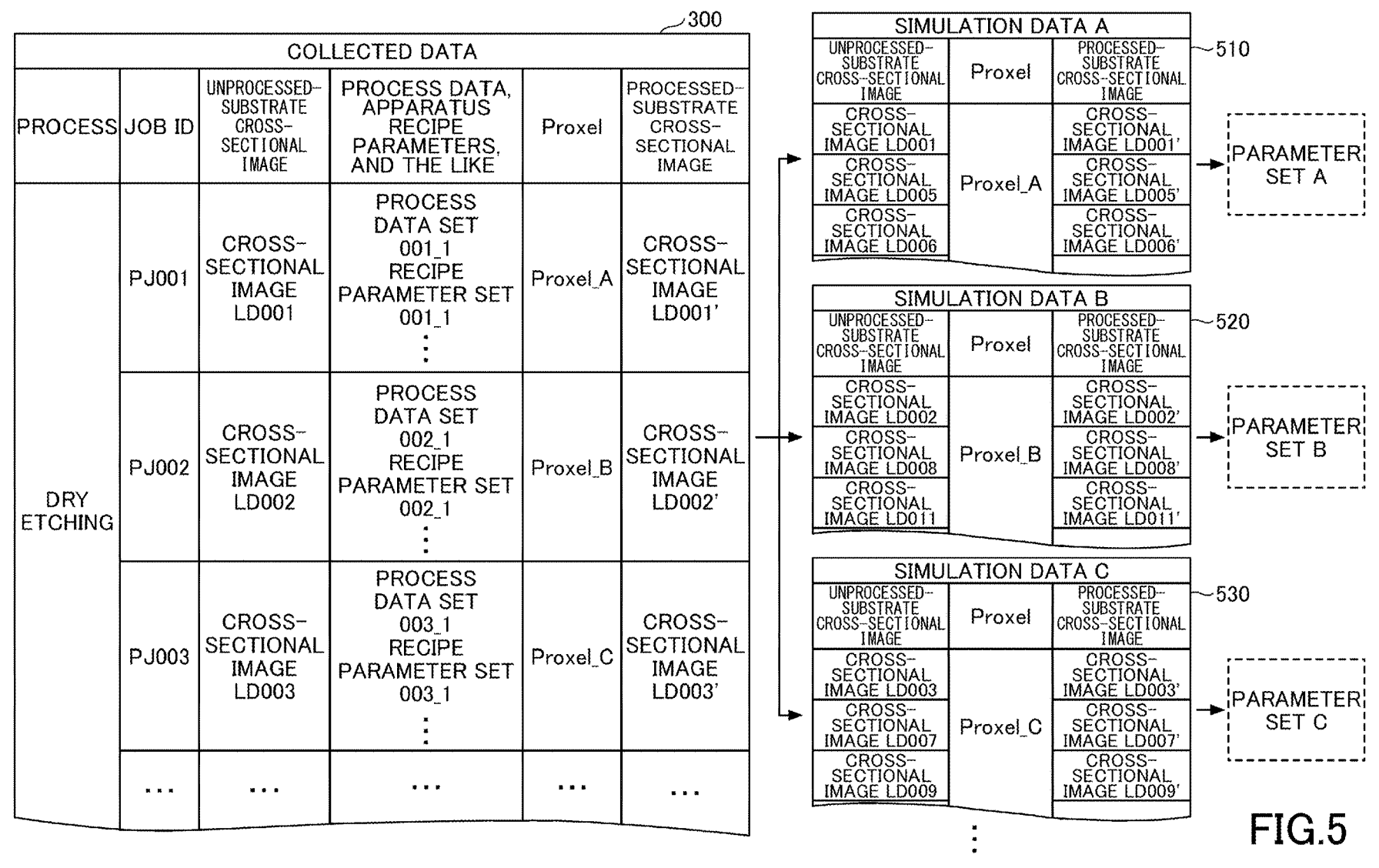

(1) Specific Example of Processing Performed by Simulation Data Generation Unit First, a specific example of processing performed by the simulation data generation unit 410 is explained. FIG. 5 is a diagram illustrating a specific example of processing performed by the simulation data generation unit 410.

As illustrated in FIG. 5, the simulation data generation unit 410 reads the collected data 300 from the collected data storage unit 122, and generates simulation data for each of the same Proxels.

The example of FIG. 5 shows that the simulation data generation unit 410 generates:

simulation data 510 (data name="simulation data A");
simulation data 520 (data name="simulation data B"); and
simulation data 530 (data name="simulation data C"), on the basis of the collected data 300.

In the example of FIG. 5, the simulation data 510 is simulation data constituted by pair associated with Proxel name="Proxel_A" from among multiple pairs of cross-sectional images, each pair being constituted by an unprocessed-substrate cross-sectional image and a processed-substrate cross-sectional image, included in the collected data 300.

Likewise, in the example of FIG. 5, the simulation data 520 is simulation data constituted by pair associated with Proxel name="Proxel_B" from among the multiple pairs included in the collected data 300.

Likewise, in the example of FIG. 5, the simulation data 530 is simulation data constituted by pair associated with Proxel name="Proxel_C" from among the multiple pairs included in the collected data 300.

As described above, the evaluation data generation unit 121 derives the optimum simulation parameter set by using the simulation data for each of the same Proxels. In the example of FIG. 5, the optimum simulation parameter set for a set name="parameter set A" is derived by using the simulation data 510;
the optimum simulation parameter set for a set name="parameter set B" is derived by using the simulation data 520; and
the optimum simulation parameter set for a set name="parameter set C" is derived by using the simulation data 530.

Next, a specific example of simulation data is explained. FIG. 6 is a diagram illustrating a specific example of simulation data stored in the simulation data storage unit 123.

In FIG. 6, the unprocessed-substrate cross-sectional images (shown on the left side of the table) are unprocessed-substrate cross-sectional images of which file names are "cross-sectional image LD001", "cross-sectional image LD005", and "cross-sectional image LD006". In FIG. 6, the processed-substrate cross-sectional images (shown on the right side of the table) are processed-substrate cross-sectional images of which file names are "cross-sectional image LD001'", "cross-sectional image LD005'", and "cross-sectional image LD006'".

Figure 7:
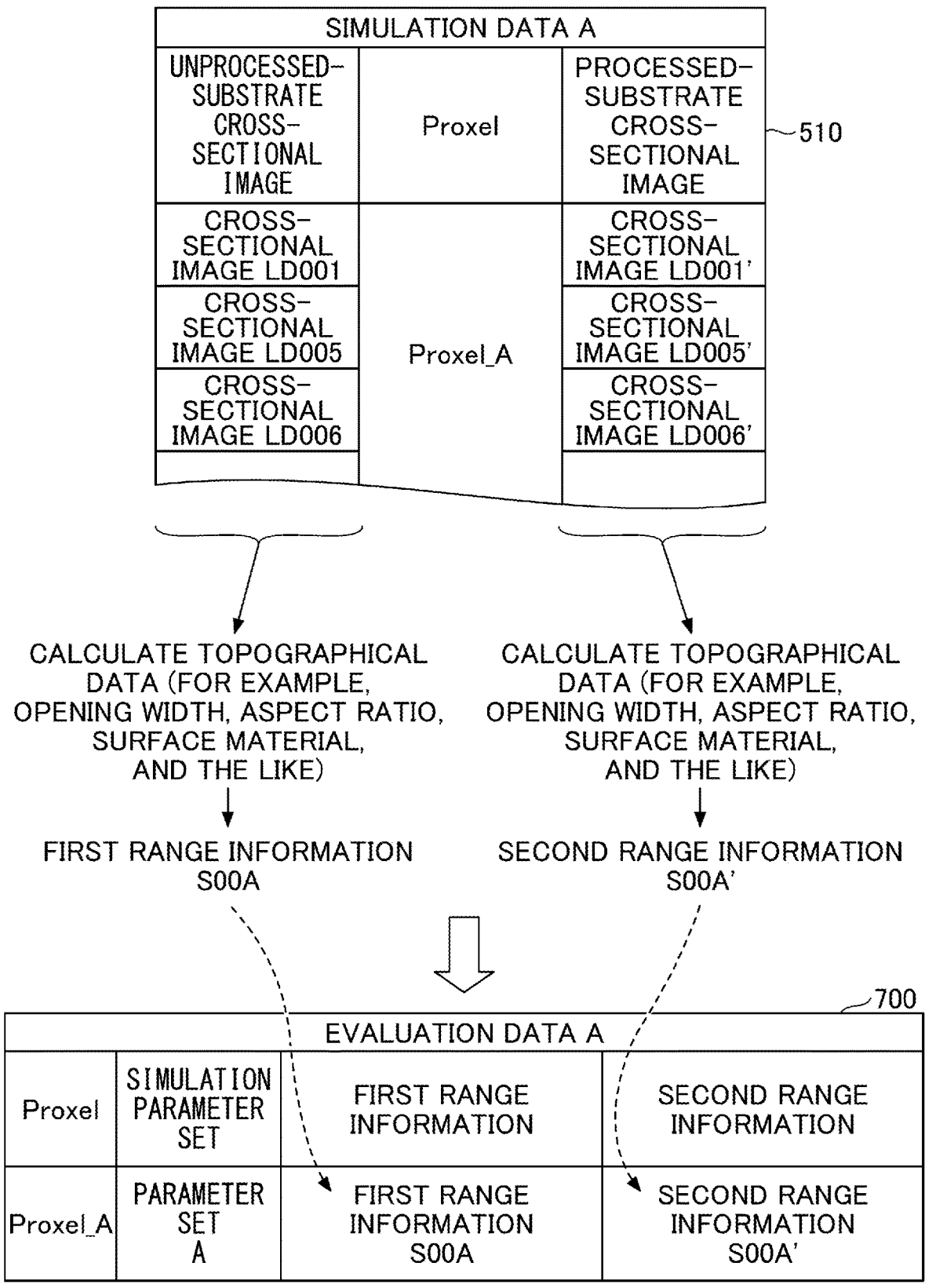
FIG. 7 is a diagram illustrating a specific example of processing of a simulation parameter calculation unit.

(2) Specific Example of Processing Performed by Simulation Parameter Calculation Unit Next, a specific example of processing performed by the simulation parameter calculation unit 430 is explained. FIG. 7 is a diagram illustrating a specific example of processing performed by the simulation parameter calculation unit 430. As described above, the processing executed by the simulation parameter calculation unit 430 includes processing for calculating the optimum simulation parameter set and processing for generating evaluation data, but hereinafter, a specific example of processing for generating evaluation data is explained.

The example of FIG. 7 shows that the simulation parameter calculation unit 430 generates evaluation data 700 (file name="evaluation data A"). As illustrated in FIG. 7, the evaluation data 700 includes, as items of information, "Proxel", "simulation parameter set", "first range information", and "second range information".

Among them, the item "Proxel" stores, for example, Proxel name="Proxel_A" associated with multiple pairs included in the simulation data 510 (data name="simulation data A").

Furthermore, the item "simulation parameter set" stores a simulation parameter set for the set name="parameter set A" derived based on the simulation data 510.

Furthermore, the item "first range information" stores first range information of a range of topography data of unprocessed-substrate cross-sectional images stored in the item "unprocessed-substrate cross-sectional image" of the simulation data 510 (for example, an opening width, an aspect ratio, a surface material, and the like). The example of FIG. 7 shows that the topography data is calculated on the basis of the unprocessed-substrate cross-sectional images stored in the item "unprocessed-substrate cross-sectional image" of the simulation data 510. Also, the example of FIG. 7 shows that first range information (data name "first range informa-tion S00A") is calculated on the basis of the calculated topography data.

Furthermore, the item "second range information" stores second range information of a range of topography data of processed-substrate cross-sectional images stored in the item "processed-substrate cross-sectional image" of the simulation data 510 (for example, an opening width, an aspect ratio, a surface material, and the like). The example of FIG. 7 shows that the topography data is calculated on the basis of the processed-substrate cross-sectional images stored in the item "processed-substrate cross-sectional image" of the simulation data 510. Also, the example of FIG. 7 shows that second range information (data name="second range information S00A") is calculated on the basis of the calculated topography data.

Flow of Evaluation Data Generation Processing

Next, a flow of evaluation data generation processing performed by the evaluation data generation apparatus 120 is explained. FIG. 8 is a flowchart illustrating a flow of evaluation data generation processing.

In step S801, the evaluation data generation apparatus 120 reads collected data, and generates simulation data.

In step S802, the evaluation data generation apparatus 120 obtains multiple pairs of cross-sectional images, each pair being constituted by an unprocessed-substrate cross-sec-tional image and a processed-substrate cross-sectional image, included in the simulation data of a particular Proxel.

In step S803, the evaluation data generation apparatus 120 inputs the default values of the simulation parameter to the topography simulator 130.

In step S804, the evaluation data generation apparatus 120 inputs unprocessed-substrate cross-sectional images included in the multiple pairs to the topography simulator 130.

In step S805, the evaluation data generation apparatus 120 operates the topography simulator 130.

In step S806, the evaluation data generation apparatus 120 obtains the predicted processed-substrate cross-sectional image from the topography simulator 130.

In step S807, the evaluation data generation apparatus 120 calculates a difference value between a processed-substrate cross-sectional image and a predicted processed-substrate cross-sectional image included in each of the multiple pairs.

In step S808, the evaluation data generation apparatus 120 determines whether the sum of difference values is mini-mized.

In step S808, in a case where the evaluation data genera-tion apparatus 120 determines that the sum of difference values is not minimized (in a case of No in step S808), the evaluation data generation apparatus 120 proceeds to step S809.

In step S809, the evaluation data generation apparatus 120 changes the values of the simulation parameter, inputs the changed values of the simulation parameter to the topogra-phy simulator 130, and thereafter returns to step S804.

Conversely, in step S808, in a case where the evaluation data generation apparatus 120 determines that the sum of difference values is minimized (in a case of Yes in step S808), the evaluation data generation apparatus 120 pro-ceeds to step S810.

In step S810, the evaluation data generation apparatus 120 stores, to the evaluation data storage unit 124, a simulation parameter set constituted by the optimum values of the simulation parameter that minimize the sum of difference values.

In step S811, the evaluation data generation apparatus 120 calculates each piece of topography data of unprocessed substrates on the basis of the unprocessed-substrate cross-sectional images included in the multiple pairs, and stores the first range information indicating a range of each piece of topography data to the evaluation data storage unit 124. Also, the evaluation data generation apparatus 120 calcu-lates each piece of topography data of processed substrates on the basis of the processed-substrate cross-sectional images included in the multiple pairs, and stores the second range information indicating a range of each piece of topography data to the evaluation data storage unit 124.

In step S812, the evaluation data generation apparatus 120 generates evaluation data by associating the particular Proxel, the simulation parameter set, the first range infor-mation, and the second range information.

System Configuration (Evaluation Phase) of Topography Simulation System

Figure 9:
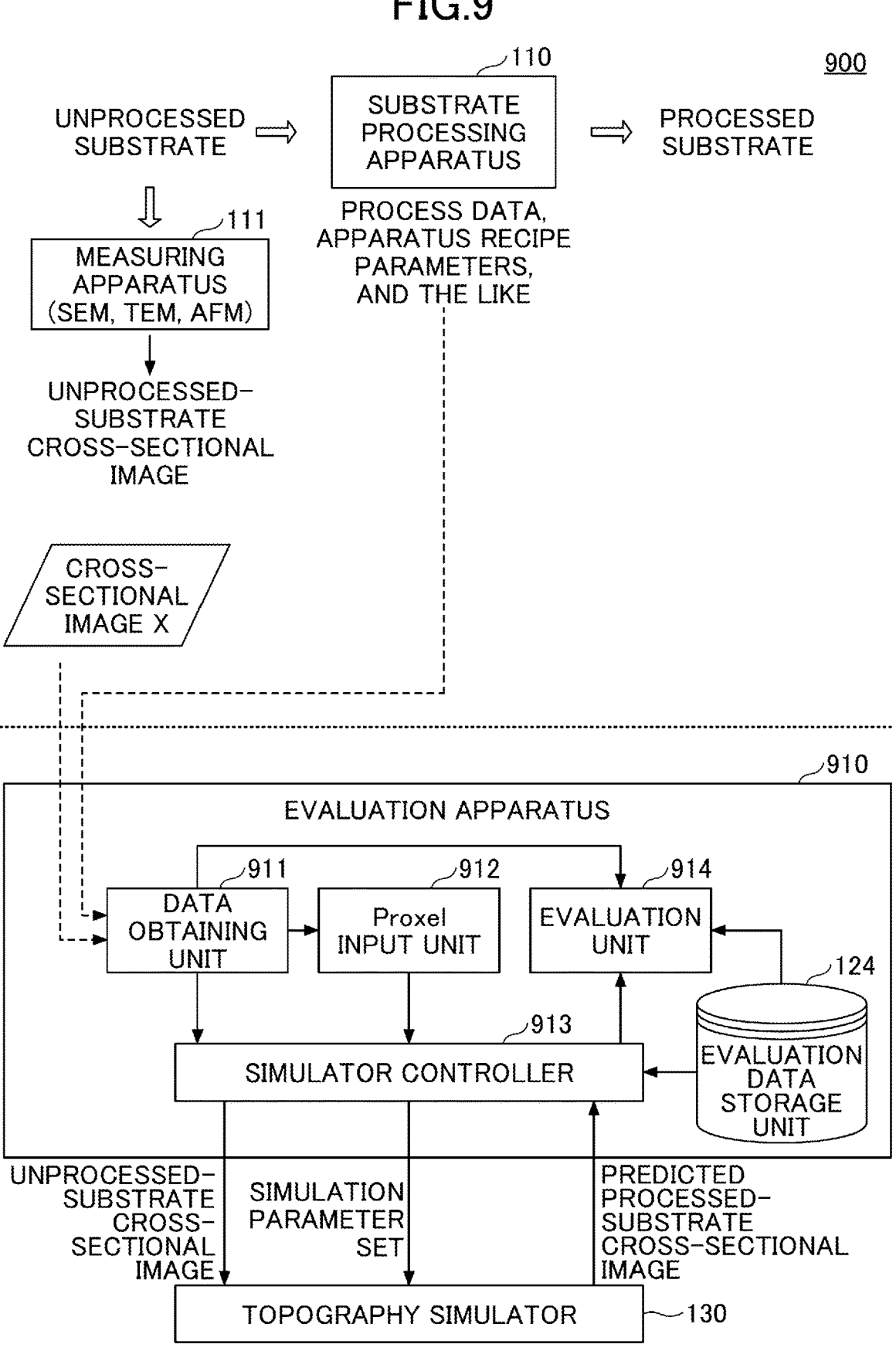
FIG. 9 is a diagram illustrating an example of a system configuration in an evaluation phase of the topography simulation system.

Next, the system configuration of the entirety of the topography simulation system in the evaluation phase is explained. FIG. 9 is a diagram illustrating an example of a system configuration in the evaluation phase of the topog-raphy simulation system.

As illustrated in FIG. 9, in the evaluation phase, the topography simulation system 900 includes a substrate pro-cessing apparatus 110, a measuring apparatus 111, an evalu-ation apparatus 910, and a topography simulator 130.

Among them, the substrate processing apparatus 110, the measuring apparatus 111, and the topography simulator 130 have already been explained with reference to FIG. 1, and accordingly explanation thereabout is omitted.

The example of FIG. 9 shows that the measuring appa-ratus 111 generates an unprocessed-substrate cross-sectional image with a file name="cross-sectional image X".

An evaluation program is installed in the evaluation apparatus 910, and when the evaluation program is executed, the evaluation apparatus 910 functions as a data obtaining unit 911, a Proxel input unit 912, a simulator controller 913, and an evaluation unit 914.

The data obtaining unit 911 obtains the unprocessed-substrate cross-sectional image generated by the measuring apparatus 111, and obtains the processing conditions (pro-cess data, recipe parameters, and the like) stored by the substrate processing apparatus 110. The data obtaining unit 911 sends the obtained unprocessed-substrate cross-sec-tional image to the simulator controller 913 and the evalu-ation unit 914. Also, the data obtaining unit 911 sends the obtained processing conditions (process data, recipe param-eters, and the like) to the Proxel input unit 912.

The Proxel input unit 912 determines which of the Proxels the processing conditions (process data, recipe parameters, and the like) received from the data obtaining unit 911 belong to, and sends the determined Proxel to the simulator controller 913.

The simulator controller 913 is an example of a prediction unit. The simulator controller 913 refers to the evaluation data storage unit 124 on the basis of the Proxel received from the Proxel input unit 912 to read the simulation parameter set associated with the received Proxel. Also, the simulator controller 913 inputs the unprocessed-substrate cross-sectional image received from the data obtaining unit 911 and the read simulation parameter set to the topography simulator 130 to operate the topography simulator 130.

Furthermore, the simulator controller 913 operates the topography simulator 130 to obtain a predicted processed-substrate cross-sectional image that is output from the topography simulator 130. Furthermore, the simulator controller 913 sends the obtained predicted processed-substrate cross-sectional image to the evaluation unit 914.

The evaluation unit 914 calculates the topography data of the unprocessed substrate on the basis of the unprocessed-substrate cross-sectional image received from the data obtaining unit 911. Also, the evaluation unit 914 calculates the topography data of the processed substrate on the basis of the predicted processed-substrate cross-sectional image received from the simulator controller 913.

Furthermore, the evaluation unit 914 refers to the evaluation data storage unit 124 to determine whether the topography data of the unprocessed substrate calculated based on the unprocessed-substrate cross-sectional image is included in the range identified by the range identified by the first range information. Likewise, the evaluation unit 914 refers to the evaluation data storage unit 124 to determine whether the topography data of the processed substrate calculated based on the predicted processed-substrate cross-sectional image is included in the range identified by the second range information.

Furthermore, as a result of determination, in a case where the topography data of the unprocessed substrate calculated based on the unprocessed-substrate cross-sectional image is included in the range identified by the first range information, and in a case where the topography data of the processed substrate calculated based on the predicted processed-substrate cross-sectional image is included in the range identified by the second range information, the evaluation unit 914 determines that the predicted processed-substrate cross-sectional image that is output from the topography simulator 130 is a high-accuracy prediction result.

Conversely, as a result of determination, in a case where the topography data of the unprocessed substrate calculated based on the unprocessed-substrate cross-sectional image is outside the range identified by the first range information, or in a case where the topography data of the processed substrate calculated based on the predicted processed-substrate cross-sectional image is outside the range identified by the second range information, then, the evaluation unit 914 determines that the predicted processed-substrate cross-sectional image that is output from the topography simulator 130 is a low-accuracy prediction result.

In a case where the evaluation unit 914 determines that the predicted processed-substrate cross-sectional image is the low-accuracy prediction result, for example, the evaluation apparatus 910 may perform, processing for updating the simulation parameter set of the corresponding evaluation data stored in the evaluation data storage unit 124 and processing for updating the first or second range information. Alternatively, the evaluation apparatus 910 may perform, processing for specifying a new Proxel and generating new evaluation data.

However, in a case where the evaluation unit 914 determines that the predicted processed-substrate cross-sectional image is the high-accuracy prediction result, the evaluation apparatus 910 does not perform the above-described processing.

Hardware Configuration of Evaluation Apparatus

Next, a hardware configuration of the evaluation apparatus 910 is explained. The hardware configuration of the evaluation apparatus 910 is substantially the same as the hardware configuration of the evaluation data generation apparatus 120 (see FIG. 2), and accordingly, difference from the evaluation data generation apparatus 120 is hereinafter explained.

In the evaluation apparatus 910, the processor 201 loads the evaluation program to the memory 202 and executes the evaluation program. Furthermore, in the evaluation apparatus 910, the auxiliary storage device 203 implements the evaluation data storage unit 124.

Furthermore, in the case of the evaluation apparatus 910, a display apparatus for displaying a determination result of the evaluation unit 914 is connected to the interface device 204. Also, in the case of the evaluation apparatus 910, the communication device 205 communicates with the substrate processing apparatus 110 and the measuring apparatus 112.

Figure 10:
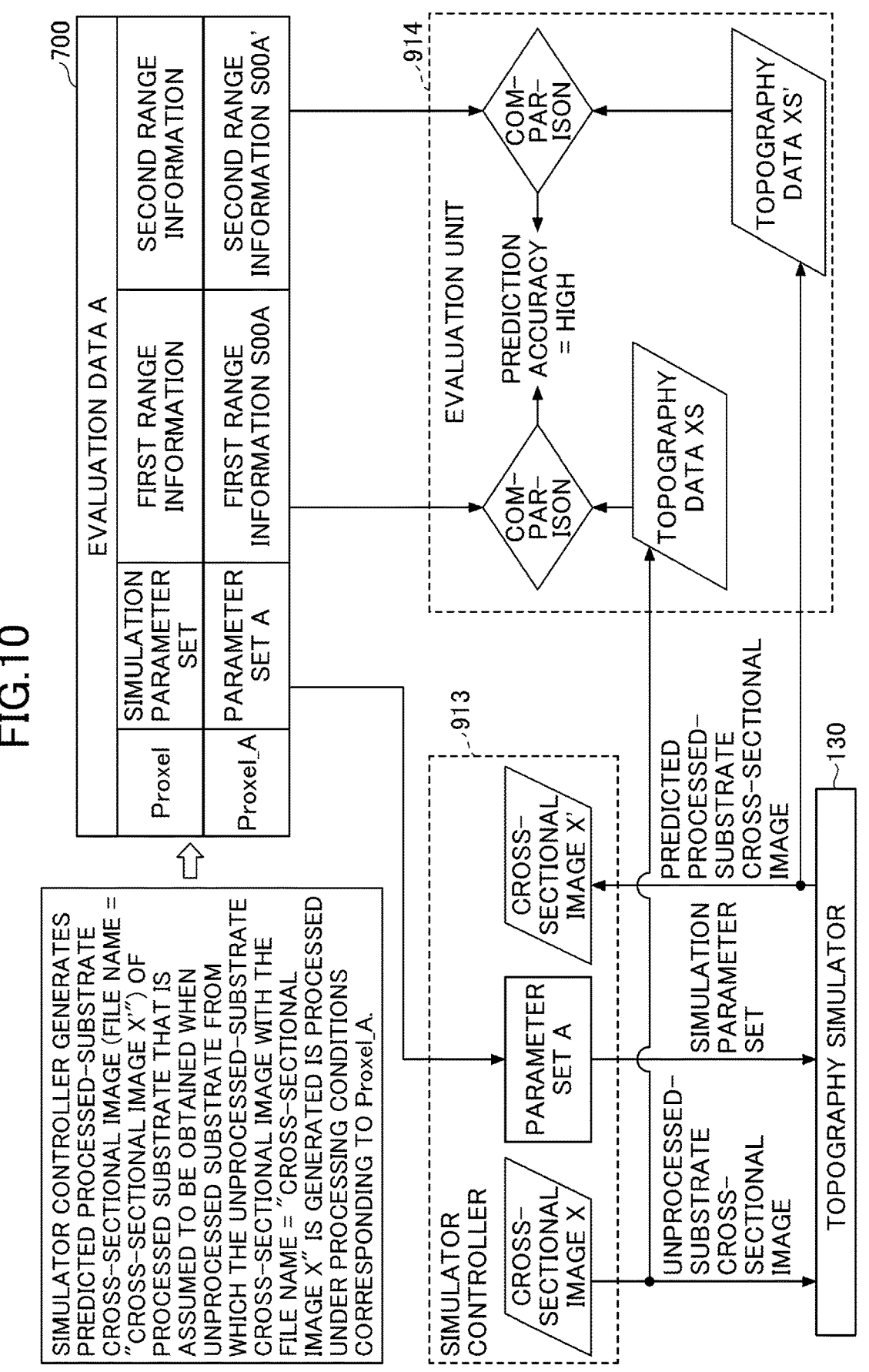
FIG. 10 is a diagram illustrating a specific example of processing of a simulator controller and an evaluation unit.

Specific Example of Processing Performed by Simulation Controller and Evaluation Unit Next, among each unit of the evaluation apparatus 910, a specific example of processing performed by the simulator controller 913 and the evaluation unit 914 is explained. FIG. 10 is a diagram illustrating a specific example of processing the simulator controller 913 and the evaluation unit 914.

In the example of FIG. 10, the simulator controller 913 performs processing for generating a predicted processed-substrate cross-sectional image in a case where, an unprocessed substrate from which the unprocessed-substrate cross-sectional image with the file name="cross-sectional image X" is generated, is processed under, processing conditions (process data, recipe parameters, and the like) corresponding to the Proxel_A.

Furthermore, in the example of FIG. 10, the evaluation unit 914 performs processing, in a case where a prediction accuracy of a predicted processed-substrate cross-sectional image (file name="cross-sectional image X'"), is evaluated using the evaluation data 700.

Specifically, the simulator controller 913 inputs, into the topography simulator 130, the unprocessed-substrate cross-sectional image with the file name="cross-sectional image X" and the simulation parameter set with the set name "parameter set A" associated with the Proxel_A. In response, the topography simulator 130 outputs the predicted processed-substrate cross-sectional image with the file name="cross-sectional image X'".

In this case, the evaluation unit 914 calculates topography data of the unprocessed substrate (data name="topography data XS") on the basis of the unprocessed-substrate cross-sectional image (file name "cross-sectional image X"). Furthermore, the evaluation unit 914 calculates topography data of the processed substrate (data name="topography data XS'") on the basis of a predicted processed-substrate cross-sectional image (file name="cross-sectional image X'").

Furthermore, the evaluation unit 914 determines whether the topography data of the unprocessed substrate (data name="topography data XS") is included in the range identified by the first range information of data name="first range information S00A" stored in the evaluation data 700. Furthermore, the evaluation unit 914 determines whether the topography data of the processed substrate (data name="topography data XS'") is included in the range identified by the second range information of data name="second range information S00A'" stored in the evaluation data 700. The example of FIG. 10 shows that:

the topography data of the unprocessed substrate (data name="topography data XS") is determined to be included in the range identified by the first range information of the data name="first range information S00A", and the topography data of the processed substrate (data name="topography data XS'") is determined to be the range identified by the second range information of the data name="second range information S00A'", so that the predicted processed-substrate cross-sectional image (file name="cross-sectional image X'") is determined to be a high-accuracy prediction result.

Flow of Evaluation Processing

Next, a flow of evaluation processing of the evaluation apparatus 910 is explained. FIG. 11 is a flowchart illustrating a flow of the evaluation processing.

In step S1101, the evaluation apparatus 910 determines a Proxel corresponding to the processing condition, and inputs the simulation parameters associated with the determined Proxel to the topography simulator 130.

In step S1102, the evaluation apparatus 910 inputs an unprocessed-substrate cross-sectional image to the topography simulator 130.

In step S1103, the evaluation apparatus 910 operates the topography simulator 130. In response, the topography simulator 130 outputs a predicted processed-substrate cross-sectional image.

In step S1104, the evaluation apparatus 910 obtains a predicted processed-substrate cross-sectional image that is output from the topography simulator 130.

In step S1105, the evaluation apparatus 910 calculates the topography data of the unprocessed substrate on the basis of the unprocessed-substrate cross-sectional image that is input to the topography simulator 130.

In step S1106, the evaluation apparatus 910 refers to the evaluation data, and determines whether the calculated topography data of the unprocessed substrate is included in the range identified by the first range information. In step S1106, in a case where the calculated topography data of the unprocessed substrate is determined to be outside the range identified by the first range information (in a case of No in step S1106), the evaluation apparatus 910 proceeds to step S1110.

Conversely, in step S1106, in a case where the calculated topography data of the unprocessed substrate is determined to be included in the range identified by the first range information (in a case of Yes in step S1106), the evaluation apparatus 910 proceeds to step S1107.

In step S1107, the evaluation apparatus 910 calculates the topography data of the processed substrate on the basis of the predicted processed-substrate cross-sectional image.

In step S1108, the evaluation apparatus 910 refers to the evaluation data to determine whether the calculated topography data of the processed substrate is included in the range identified by the second range information. In step S1108, in a case where the calculated topography data of the processed substrate is determined to be included in the range identified by the second range information (in a case of Yes in step S1108), the evaluation apparatus 910 proceeds to step S1109.

In step S1109, the evaluation apparatus 910 determines that the predicted processed-substrate cross-sectional image is a high-accuracy prediction result.

Conversely, in step S1108, in a case where the calculated topography data of the processed substrate is determined to be outside the range identified by the second range information (in a case of No in step S1108), the evaluation apparatus 910 proceeds to step S1110.

In step S1110, the evaluation apparatus 910 determines that the predicted processed-substrate cross-sectional image is a low-accuracy prediction result.

Summary

As can be understood from the above explanation, the evaluation apparatus according to the first embodiment is configured to:

calculate the simulation parameters of the topography simulator so that the output of the topography simulator in response to an unprocessed-substrate cross-sectional image of an unprocessed substrate becomes close to a processed-substrate cross-sectional image of a processed substrate obtained when the unprocessed substrate is processed under a predetermined processing condition;

calculate first range information indicating a topography range in which topography data is deemed to be the same as topography data of the unprocessed-substrate cross-sectional image used for calculation of simulation parameters;

calculate second range information indicating a topography range in which topography data is deemed to be the same as topography data of the processed-substrate cross-sectional image used for calculation of simulation parameters;

generate evaluation data by associating the simulation parameter, the first range information, the second range information thus calculated, and store the valuation data to the evaluation data storage unit;

input an unprocessed-substrate cross-sectional image of a new unprocessed substrate and the calculated simulation parameters to the topography simulator, and predict a predicted processed-substrate cross-sectional image of the processed substrate that is obtained when the new unprocessed substrate is processed under the above-described predetermined processing condition; and output a result of comparison between the topography data of the unprocessed substrate calculated based on the unprocessed-substrate cross-sectional image and the first range information, and output a result of comparison between the topography data of the processed substrate calculated based on the predicted processed-substrate cross-sectional image and the second range information.

Accordingly, the evaluation apparatus according to the first embodiment can determine whether the predicted processed-substrate cross-sectional image that is output from the topography simulator is a high-accuracy prediction result or is a low-accuracy prediction result.

Specifically, according to the first embodiment, a prediction result predicted by the topography simulator can be evaluated.

Second Embodiment

In the above-described first embodiment, when the prediction result predicted by the topography simulator is evaluated, the topography simulator 130 is operated once by using a single simulation parameter set. In contrast, in the second embodiment, the topography simulator 130 is operated multiple times by using multiple simulation parameter sets.

Figure 12:
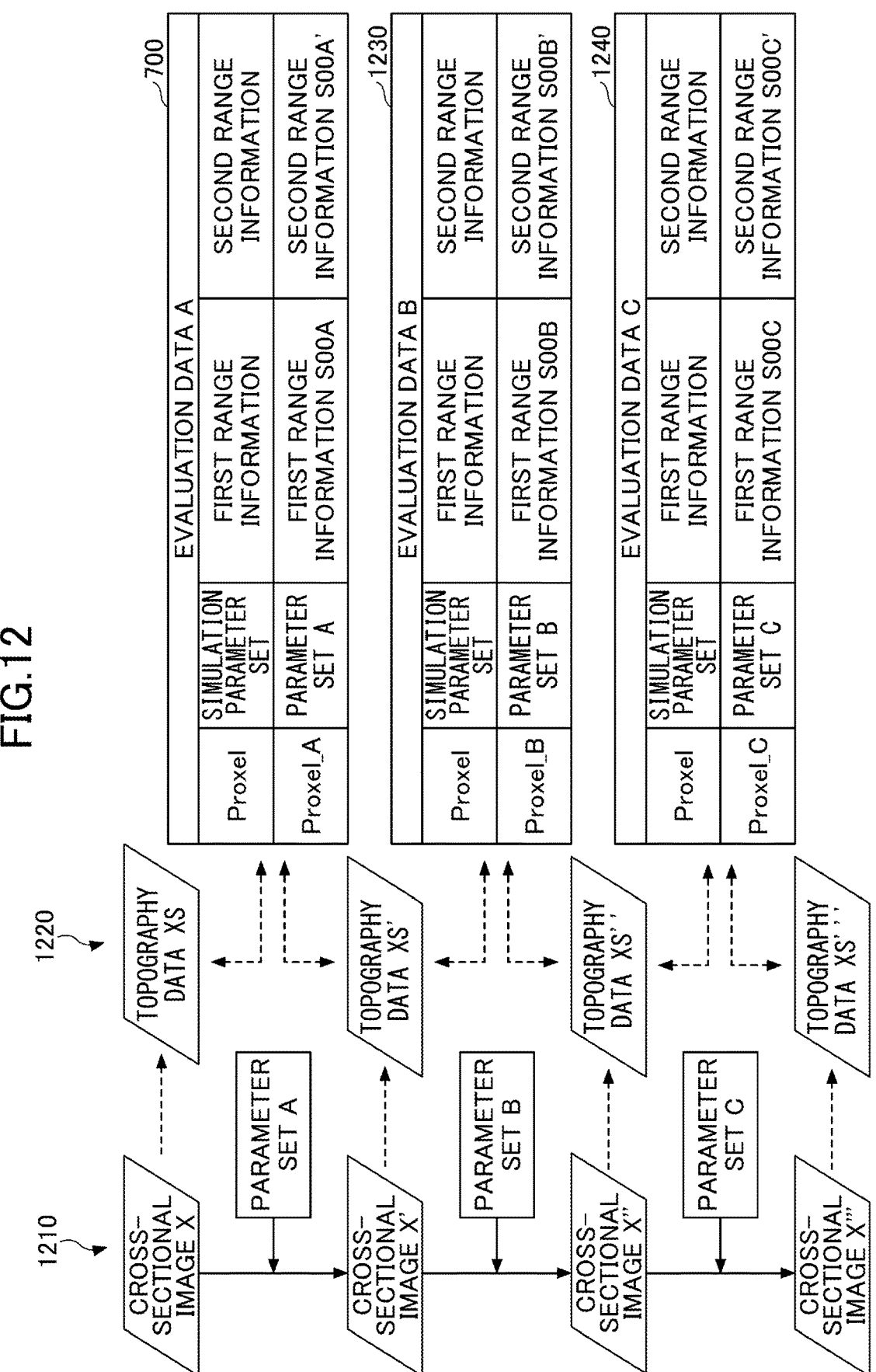
FIG. 12 is a diagram illustrating a specific example of evaluation processing.

FIG. 12 is a diagram illustrating a specific example of evaluation processing performed by the evaluation apparatus 910. In FIG. 12, reference symbol 1210 indicates that the simulator controller 913 of the evaluation apparatus 910 operates the topography simulator 130 multiple times.

Specifically, it is shown that the topography simulator 130 is operated three times by using multiple simulation parameter sets with set names="parameter set A" to "parameter set C".

According to the example of the reference symbol 1210 in FIG. 12, the unprocessed-substrate cross-sectional image with the file name="cross-sectional image X" and the simulation parameter set with the set name="parameter set A" are input. In response, the topography simulator 130 outputs a predicted processed-substrate cross-sectional image with a file name="cross-sectional image X'".

Furthermore, according to the example of the reference symbol 1210 in FIG. 12, the predicted processed-substrate cross-sectional image with the file name="cross-sectional image X'" is input as an unprocessed-substrate cross-sectional image, together with the simulation parameter set with the set name="parameter set B". In response, the topography simulator 130 outputs a predicted processed-substrate cross-sectional image with a file name="cross-sectional image X''".

Furthermore, according to the example of the reference symbol 1210 in FIG. 12, the predicted processed-substrate cross-sectional image with the file name="cross-sectional image X''" is input as an unprocessed-substrate cross-sectional image together with the simulation parameter set with the set name="parameter set C". In response, the topography simulator 130 outputs a predicted processed-substrate cross-sectional image with a file name="cross-sectional image X'''".

In FIG. 12, reference symbol 1220 indicates that the evaluation unit 914 of the evaluation apparatus 910 evaluates a prediction result.

Specifically, the example of the reference symbol 1220 shows that, when the topography simulator 130 is operated for the first time, the evaluation unit 914 compares:

the topography data of the unprocessed substrate (data name="topography data XS") of the first time calculated on the basis of the unprocessed-substrate cross-sectional image with the file name="cross-sectional image X"; and the range identified by the first range information (data name="first range information S00A") of the evaluation data 700, and compares:

the topography data of the processed substrate (data name="topography data XS'") of the first time calculated on the basis of the predicted processed-substrate cross-sectional image with the file name="cross-sectional image X'"; and the range identified by the second range information (data name="second range information S00A'") of the evaluation data 700.

Furthermore, the example of the reference symbol 1220 of FIG. 12 shows that, when the topography simulator 130 is operated for the second time, the evaluation unit 914 compares:

the topography data of the unprocessed substrate (data name="topography data XS'") of the second time calculated on the basis of the predicted processed-substrate cross-sectional image with the file name="cross-sectional image X'"; and the range identified by the first range information (data name="first range information S00B") of the evaluation data 1230, and compares:

the topography data of the processed substrate (data name="topography data XS''") of the second time calculated on the basis of the predicted processed-substrate cross-sectional image with the file name="cross-sectional image X''"; and the range identified by second range information (data name="second range information S00B'") of the evaluation data 1230.

Furthermore, the example of the reference symbol 1220 of FIG. 12 shows that, when the topography simulator 130 is operated for the third time, the evaluation unit 914 compares:

the topography data of the unprocessed substrate (data name="topography data XS''") of the third time calculated on the basis of the predicted processed-substrate cross-sectional image with the file name="cross-sectional image X''"; and the range identified by the first range information (data name="first range information S00C") of the evaluation data 1240, and compares:

the topography data of the processed substrate (data name="topography data XS'''") of the third time calculated on the basis of the predicted processed-substrate cross-sectional image with the file name="cross-sectional image X'''"; and the range identified by the second range information (data name="second range information S00C'") of the evaluation data 1240.

In this manner, in a case where the topography simulator 130 is operated using multiple simulation parameter sets to obtain the final prediction result, the topography data of the processed substrate calculated on the basis of the predicted processed-substrate cross-sectional images for n times (n is an integer of 1 or more) is compared by using:

the second range information associated with the simulation parameter set used to operate the topography simulator for the n-th time; and the first range information associated with the simulation parameter set used to operate the topography simulator for the (n+1)-th time.

Accordingly, as a result of comparing the first and second range information in each time, in a case where the topography data is determined to be included in the range identified by the first and second range information in comparisons performed multiple times, the evaluation unit 914 determines that the final predicted processed-substrate cross-sectional image is a high-accuracy prediction result.

Furthermore, as a result of comparing the first and second range information in each time, in a case where the topography data is determined to be outside the range identified by the first and second range information in any of the comparisons performed multiple times, the valuation unit 914 determines that the final predicted processed-substrate cross-sectional image is a low-accuracy prediction result.

Specifically, according to the second embodiment, in a case where the topography simulator is operated multiple times, the prediction result predicted by the topography simulator can be evaluated.

Third Embodiment

In the above-described second embodiment, the topography simulator 130 is operated multiple times using a combination of multiple simulation parameter sets determined in advance. In contrast, in the third embodiment, the topography simulator 130 is operated multiple times, so that a combination of simulation parameter sets based on which the ultimately targeted topography data can be obtained and a high-accuracy prediction result can be obtained is searched. Hereinafter, difference of the third embodiment from the above-described first and second embodiments is mainly explained.

System Configuration (Search Phase) of
Topography Simulation System

First, the system configuration of the entirety of the topography simulation system in the search phase is explained. The search phase is a phase in which:

the topography simulator is operated multiple times by using a combination of simulation parameters included in the generated evaluation data, and prediction results are evaluated by using the first range information and second range information and the ultimately targeted topography data, so that a combination of simulation parameter sets based on which the ultimately targeted topography data can be obtained and a high-accuracy prediction result can be obtained is searched.

Figure 13:
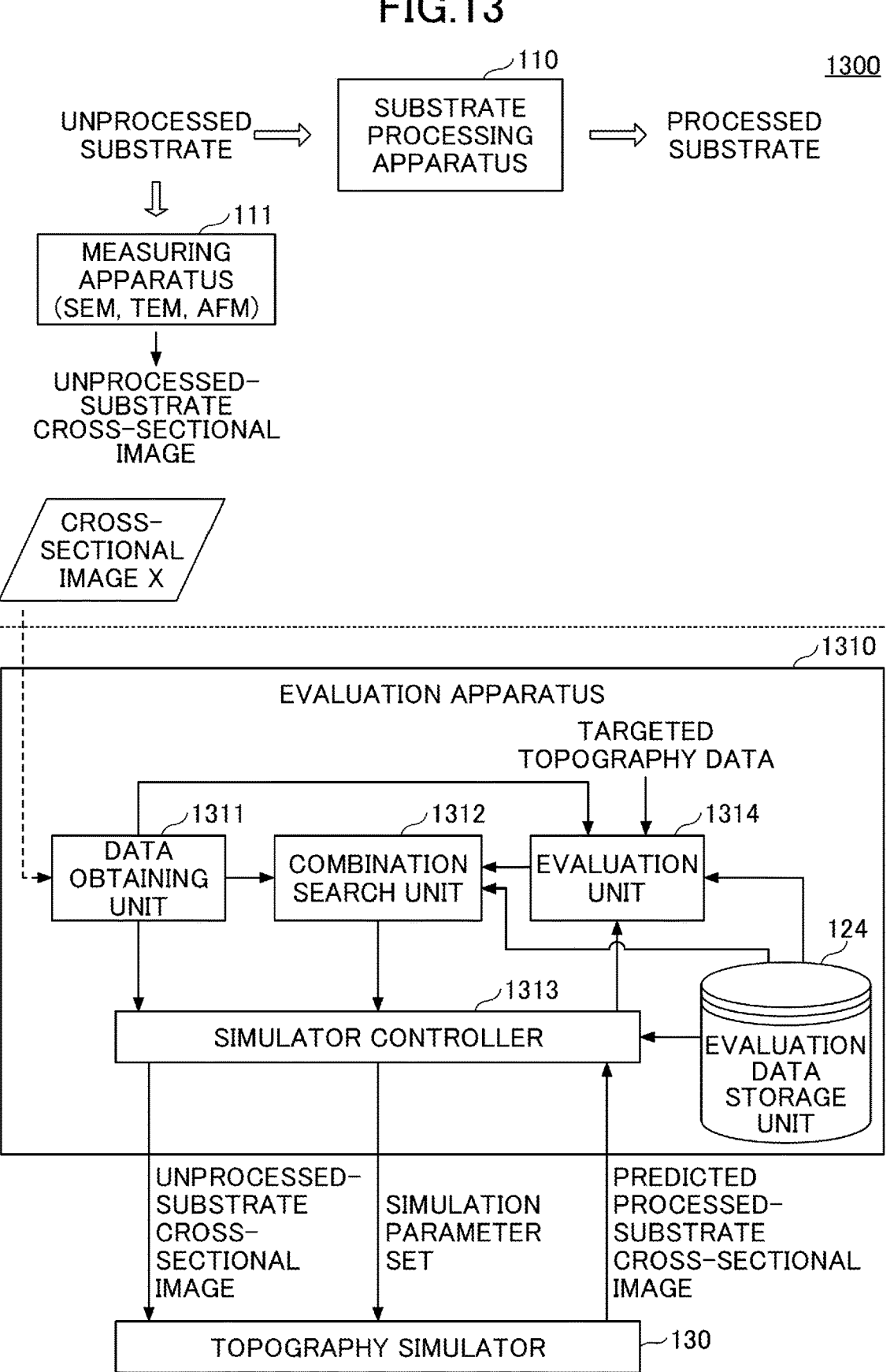
FIG. 13 is a diagram illustrating an example of a system configuration in a search phase of the topography simulation system.

FIG. 13 is a diagram illustrating an example of a system configuration in the search phase of the topography simulation system. As illustrated in FIG. 13, in the search phase, the topography simulation system 1300 includes a substrate processing apparatus 110, a measuring apparatus 111, an evaluation apparatus 1310, and a topography simulator 130.

Among them, the substrate processing apparatus 110, the measuring apparatus 111, and the topography simulator 130 have already been explained with reference to FIG. 1, and accordingly, explanation thereabout is omitted.

The evaluation program is installed in the evaluation apparatus 1310, and when the program is executed, the evaluation apparatus 1310 functions as a data obtaining unit 1311, a combination search unit 1312, a simulator controller 1313, and an evaluation unit 1314.

The data obtaining unit 1311 obtains an unprocessed-substrate cross-sectional image generated by the measuring apparatus 111, and sends the unprocessed-substrate cross-sectional image to the simulator controller 1313 and the evaluation unit 1314.

The combination search unit 1312 reads multiple simulation parameter sets from the evaluation data stored in the evaluation data storage unit 124, and generates a combination of multiple simulation parameter sets. Also, the combination search unit 1312 successively sends the multiple simulation parameter sets included in the generated combination to the simulator controller 1313.

Furthermore, upon successively sending the multiple simulation parameter sets to the simulator controller 1313, the combination search unit 1312 obtains evaluation results for predictions results from the evaluation unit 1314. The evaluation results obtained by the combination search unit 1312 include:

a first evaluation result indicating whether it is a high-accuracy prediction result or a low-accuracy prediction result; and a second evaluation result indicating whether an error between the topography data of the final processed substrate corresponding to the prediction result and the ultimately targeted topography data is equal to or less than a predetermined threshold value.

Furthermore, the combination search unit 1312 generates a new combination of simulation parameters on the basis of the evaluation results obtained by the evaluation unit 1314. Furthermore, the combination search unit 1312 successively sends the multiple simulation parameter sets included in the generated new combination to the simulator controller 1313.

Furthermore, the combination search unit 1312 outputs, as a search result, a combination of simulation parameter sets where:

a first evaluation result that is a high-accuracy prediction result is obtained; and a second evaluation result indicating that an error between the final topography data of the processed substrate corresponding to the prediction result and the ultimately targeted topography data is equal to or less than a predetermined threshold value is obtained.

The simulator controller 1313 is another example of a prediction unit. The simulator controller 1313 inputs the unprocessed-substrate cross-sectional image received from the data obtaining unit 1311 and the simulation parameter set that is first received from the combination search unit 1312 to the topography simulator 130 to operate the topography simulator 130.

Furthermore, the simulator controller 1313 sends the predicted processed-substrate cross-sectional image that is output from the topography simulator 130 to the evaluation unit 1314. Furthermore, the simulator controller 1313 inputs, to the topography simulator 130, the predicted processed-substrate cross-sectional image as an unprocessed-substrate cross-sectional image together with the simulation parameter set that is subsequently received from the combination search unit 1312, to operate the topography simulator 130. The simulator controller 1313 repeats substantially the same processing with respect to all of the simulation parameter sets received from the combination search unit 1312.

The evaluation unit 1314 calculates the topography data of the unprocessed substrate on the basis of the unprocessed-substrate cross-sectional image received from the data obtaining unit 1311. Furthermore, the evaluation unit 1314 compares:

the calculated topography data of the unprocessed substrate; and the range identified by the first range information associated with the first simulation parameter set included in the combination generated by the combination search unit 1312.

Furthermore, the evaluation unit 1314 performs comparison by using:

the second range information associated with the simulation parameter set used to operate the topography simulator 130 for the n-th time; and the first range information associated with the simulation parameter set used to operate the topography simulator 130 for the (n+1)-th time.

Accordingly, the evaluation unit 1314 sends the first evaluation result to the combination search unit 1312.

Furthermore, the evaluation unit 1314 determines whether an error between the final topography data of the processed substrate corresponding to the prediction result and the ultimately targeted topography data is equal to or less than a predetermined threshold value, and sends a second evaluation result to the combination search unit 1312. It is assumed that the ultimately targeted topography data is input to the evaluation unit 1314 in advance.

Specific Example of Evaluation and Search Processing

Figure 14:
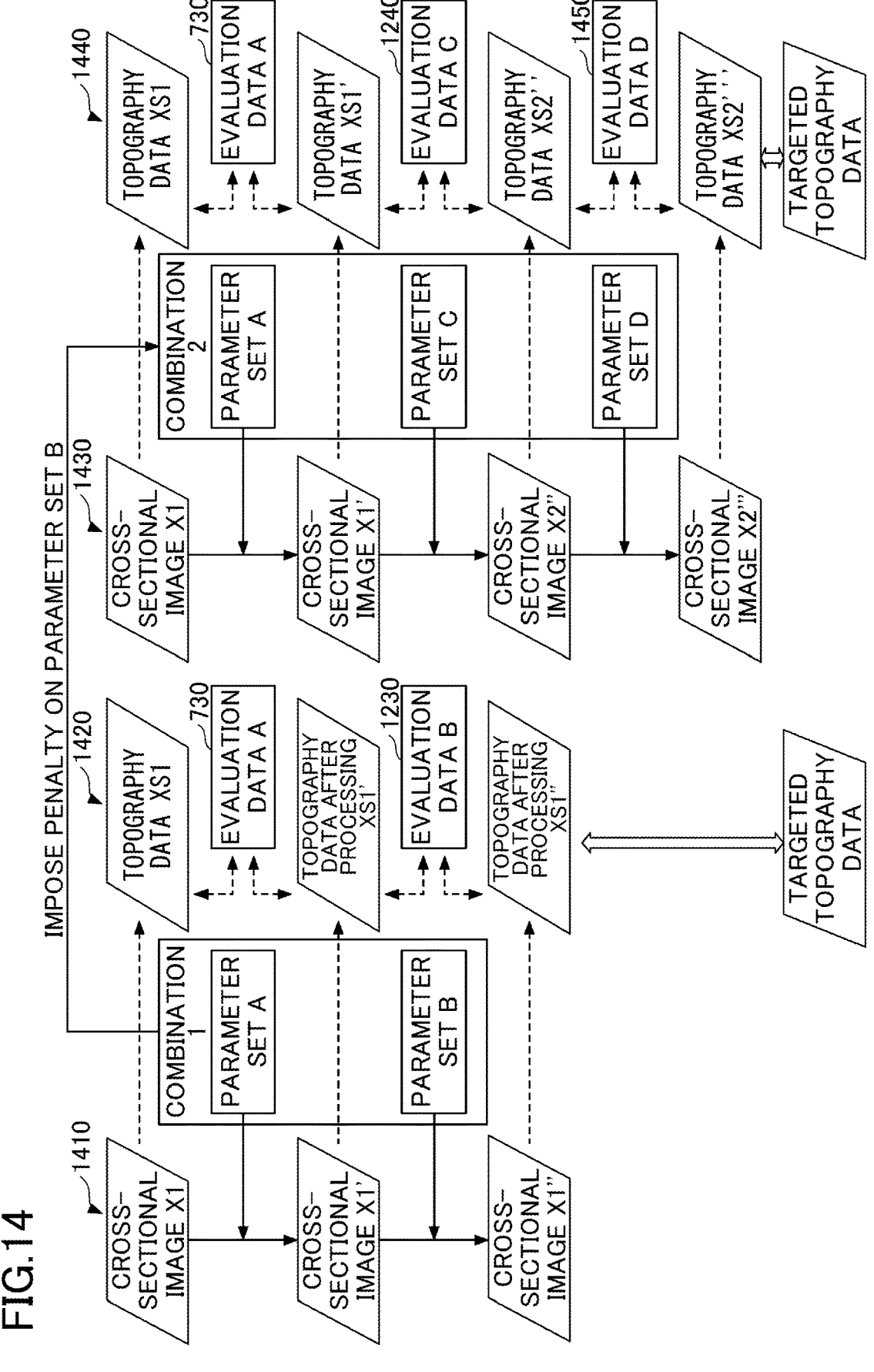
FIG. 14 is a diagram illustrating a specific example of evaluation and search processing.

Next, a specific example of evaluation and search processing performed by the evaluation apparatus 1310 is explained. FIG. 14 is a diagram illustrating a specific example of evaluation and search processing. In FIG. 14, reference symbol 1410 indicates that the simulator controller 1313 operates the topography simulator 130 multiple times.

Specifically, first, the combination search unit 1312 generates, as a combination of multiple simulation parameter sets, a combination (combination 1) of a "parameter set A" and a "parameter set B". Then, the simulator controller 1313 uses the combination 1 to operate the topography simulator 130 twice.

According to the example of the reference symbol 1410 of FIG. 14, the unprocessed-substrate cross-sectional image of the file name="cross-sectional image X1" is input, together with the simulation parameter set with the set name="parameter set A". In response, the topography simulator 130 outputs a predicted processed-substrate cross-sectional image with a file name="cross-sectional image X1'".

Furthermore, according to the example of the reference symbol 1410 of FIG. 14, a predicted processed-substrate cross-sectional image with a file name="cross-sectional image X1'" is input as an unprocessed-substrate cross-sectional image, together with the simulation parameter with the set name="parameter set B". In response, the topography simulator 130 outputs a predicted processed-substrate cross-sectional image with a file name="cross-sectional image X1''".

In FIG. 14, reference symbol 1420 indicates that the evaluation unit 1314 evaluates a prediction result.

The example of the reference symbol 1420 of FIG. 14 shows that, when the topography simulator 130 is operated for the first time, the evaluation unit 1314:

compares topography data of a unprocessed substrate (data name="topography data XS1") and the range identified by the first range information (data name="first range information S00A") of the evaluation data 700, and compares topography data of a processed substrate (data name="topography data XS1'") and the range identified by the second range information (data name="second range information S00A'") of the evaluation data 700.

Furthermore, in the example of the reference symbol 1420 of FIG. 14, when the topography simulator 130 is operated for the second time, the evaluation unit 1314:

compares the topography data of the processed substrate (data name="topography data XS1'") and the range identified by the first range information (data name="first range information S00B") of the evaluation data 1230; and compares topography data of a processed substrate (data name="topography data XS1''") and the range identified by the second range information (data name="second range information S00B'") of the evaluation data 1230.

Furthermore, the example of the reference symbol 1420 of FIG. 14 shows that, when the topography simulator 130 is operated for the second time, the evaluation unit 1314 calculates an error between:

the final topography data of the processed substrate (data name="topography data XS1''"), and ultimately targeted topography data.

At this occasion, it is assumed that the topography data of the processed substrate (data name="topography data XS1''") is outside the range identified by the second range information (data name="second range information S00B'") of the evaluation data 1230. In this case, the combination search unit 1312 imposes a penalty on the simulation parameter set with the set name="parameter set B" when a new combination is generated. As a result, the simulation parameter set with the set name="parameter set B" is less likely to be included in the new combination.

In this manner, the combination search unit 1312 is configured to:

in a case where the n-th topography data of the processed substrate is outside the range identified by the first range information associated with the simulation parameter set used for the (n+1)-th operation included in the m-th combination (m is an integer equal to or more than one), and in a case where the n-th topography data of the processed substrate is included in the range identified by the second range information associated with the simulation parameter set used for the n-th operation included in the m-th combination (m is an integer equal to or more than one), make it less likely that the simulation parameter set used for the (n+1)-th operation is included in the (m+1)-th combination when the (m+1)-th combination is generated.

Alternatively, the combination search unit 1312 is configured to:

in a case where the (n-th) topography data of the processed substrate is outside the range identified by the second range information associated with the simulation parameter set used for the n-th operation included in the m-th combination (m is an integer equal to or more than one), make it less likely that the simulation parameter set used for the n-th operation is included in the (m+1)-th combination when the (m+1)-th combination is generated.

The example of reference symbol 1430 of FIG. 14 shows that a combination of simulation parameter sets ("combination 2") including:

set name="parameter set A", set name="parameter set C", and set name="parameter set D", is generated as a new combination. Furthermore, the example of the reference symbol 1430 shows the topography simulator 130 is operated three times by using the new combination ("combination 2").

According to the example of the reference symbol 1430 of FIG. 14, the unprocessed-substrate cross-sectional image of the file name="cross-sectional image X1" and the simulation parameter set with the set name="parameter set A" are input. In response, the topography simulator 130 outputs a predicted processed-substrate cross-sectional image with a file name="cross-sectional image X1'".

Furthermore, according to the example of the reference symbol 1430 of FIG. 14, the predicted processed-substrate cross-sectional image of the file name="cross-sectional image X1'" is input as an unprocessed-substrate cross-sectional image, together with the simulation parameter with the set name="parameter set C". In response, the topography simulator 130 outputs a predicted processed-substrate cross-sectional image with a file name="cross-sectional image X2''".

Furthermore, according to the example of the reference symbol 1430 of FIG. 14, the predicted processed-substrate cross-sectional image with the file name="cross-sectional image X2''" is input as an unprocessed-substrate cross-sectional image, together with the simulation parameter set with the set name="parameter set D". In response, the topography simulator 130 outputs a predicted processed-substrate cross-sectional image with a file name="cross-sectional image X2'''".

In FIG. 14, reference symbol 1440 indicates that the evaluation unit 1314 evaluates a prediction result.

The example of the reference symbol 1440 of FIG. 14 indicates that, when the topography simulator 130 is operated for the first time, the evaluation unit 1314:

compares the topography data of the unprocessed substrate (data name="topography data XS1") and the range identified by the first range information (data name="first range information S00A") of the evaluation data 700; and compares the topography data of the processed substrate (data name="topography data XS1'") and the range identified by the second range information (data name="second range information S00A'") of the evaluation data 700.

Furthermore, the example of the reference symbol 1440 of FIG. 14 shows that, when the topography simulator 130 is operated for the second time, the evaluation unit 1314:

compares the topography data of the unprocessed substrate (data name="topography data XS1'") of the second time and the range identified by the first range information (data name="first range information S00C") of the evaluation data 1240; and compares the topography data of the processed substrate (data name="topography data XS2''") of the second time and the range identified by the second range information (data name="second range information S00C'") of the evaluation data 1240.

Furthermore, the example of the reference symbol 1440 of FIG. 14 shows that, when the topography simulator 130 is operated for the third time, the evaluation unit 1314:

compares the topography data of the unprocessed substrate (data name="topography data XS2''") of the third time and the range identified by first range information (data name="first range information S00D") of the evaluation data 1450; and the topography data of a processed substrate (data name="topography data XS2'''") of the third time and the range identified by second range information (data name="second range information S00D'") of the evaluation data 1450.

Furthermore, the example of the reference symbol 1440 of FIG. 14 shows that, when the topography simulator 130 is operated for the third time, the evaluation unit 1314 calculates an error between:

the final topography data of the processed substrate (data name="topography data XS2'''"); and the ultimately targeted topography data.

In this manner, processing for generating a new combination on the basis of the evaluation result based on the previous combination and outputting an evaluation result based on the new combination is repeated, so that the optimum combination can be searched with the combination search unit 1312.

Flow of Evaluation and Search Processing

Next, a flow of evaluation and search processing performed by the evaluation apparatus 1310 is explained. FIG. 15 is a flowchart illustrating a flow of evaluation and search processing performed by the evaluation apparatus 1310.

In step S1501, the evaluation apparatus 1310 generates, as a combination of simulation parameter sets, a default combination.

In step S1502, the evaluation apparatus 1310 inputs an unprocessed-substrate cross-sectional image to the topography simulator 130, together with one of the simulation parameter sets included in the current combination. Alternatively, the evaluation apparatus 1310 inputs, to the topography simulator 130, a predicted processed-substrate cross-sectional image that is previously output from the topography simulator 130, as a current unprocessed-substrate cross-sectional image, together with one of the simulation parameter sets included in the current combination.

In step S1503, the evaluation apparatus 1310 operates the topography simulator 130. Accordingly, the topography simulator 130 outputs the current predicted processed-substrate cross-sectional image.

In step S1504, the evaluation apparatus 1310 obtains a predicted processed-substrate cross-sectional image that is currently output from the topography simulator 130.

In step S1505, a determination is made as to whether all of the simulation parameter sets included in the current combination have been input to the topography simulator 130. In step S1505, in a case where it is determined that there is a simulation parameter set that has not yet been input to the topography simulator 130 (in a case of No in step S1505), the evaluation apparatus 1310 returns back to step S1502.

Conversely, in step S1505, in a case where it is determined that all of the simulation parameter sets included in the current combination have been input to the topography simulator 130 (in a case of Yes in step S1505), the evaluation apparatus 1310 proceeds to step S1506.

In step S1506, the evaluation apparatus 1310 calculates the topography data of the unprocessed substrate on the basis of the unprocessed-substrate cross-sectional image that is input to the topography simulator 130. Furthermore, the evaluation apparatus 1310 calculates the topography data of the processed substrate on the basis of a predicted processed-substrate cross-sectional image obtained by the topography simulator 130.

In step S1507, the evaluation apparatus 1310 refers to the evaluation data to compare the calculated topography data of the unprocessed substrate and the range identified by the first range information and compares the calculated topography data of the processed substrate and the range identified by the second range information.

In step S1508, in a case where the evaluation apparatus 1310 determines that the calculated topography data is included in the range identified by the first and second range information (in a case of Yes in step S1508), the evaluation apparatus 1310 proceeds to step S1510.

Conversely, in step S1508, in a case where the evaluation apparatus 1310 determines that the calculated topography data is outside the first or the range identified by the second range information (in a case of No in step S1508), the evaluation apparatus 1310 proceeds to step S1509.

In step S1509, the evaluation apparatus 1310 imposes a penalty according to the comparison result in step S1508 on the corresponding simulation parameter set, and proceeds to step S1511.

In step S1510, the evaluation apparatus 1310 determines whether an error between the final topography data of the processed substrate calculated based on the predicted processed-substrate cross-sectional image and the ultimately targeted topography data is equal to or less than a predetermined threshold value. In step S1510, in a case where the error is not equal to or less than the predetermined threshold value (in a case of No in step S1510), the evaluation apparatus 1310 proceeds to step S1511.

In step S1511, the evaluation apparatus 1310 generates a new combination of simulation parameter sets, and thereafter, the evaluation apparatus 1310 returns back to step S1502.

Conversely, in step S1510, in a case where the error is equal to or less than the predetermined threshold value, the evaluation apparatus 1310 proceeds to step S1512.

In step S1512, the evaluation apparatus 1310 outputs the current combination of simulation parameter sets as the optimum combination of simulation parameter sets.

Summary

As can be understood from the above explanation, the evaluation apparatus according to the third embodiment:
    evaluates a prediction result by operating the topography simulator 130 multiple times, so that an optimum combination of simulation parameter sets based on which the ultimately targeted topography data can be obtained and a high-accuracy prediction result can be obtained is searched.

Accordingly, the evaluation apparatus according to the third embodiment can generate the optimum combination of simulation parameter sets.

An evaluation apparatus, an evaluation method, and an evaluation program for evaluating a prediction result predicted by a topography simulator can be provided.

Other Embodiments

In the above-described embodiments, as topography information indicating a topography of a substrate, an unprocessed-substrate cross-sectional image is input to the topography simulator 130. However, the topography information indicating the topography of the substrate that is input to the topography simulator 130 is not limited to the unprocessed-substrate cross-sectional image. For example, the topography information may be data other than an image (for example, calculated topography data based on an unprocessed-substrate cross-sectional image). Alternatively, the topography information may be data other than a cross-sectional image (for example, a three-dimensional image).

Although a generation method for generating a new combination is not explained in the above-described third embodiment, the combination search unit 1312 may generate a generation method by using, for example, a genetic algorithm.

Although the evaluation data generation apparatus 120, the evaluation apparatus 910, the evaluation apparatus 1310, and the topography simulator 130 are separately provided in the above-described embodiments, they may be provided as an integrated apparatus. Furthermore, although the evaluation data generation apparatus 120, the evaluation apparatus 910, and the evaluation apparatus 1310 are separately provided in the above-described embodiments, they may be provided as an integrated apparatus.

The present invention is not limited to the configurations described in the above-described embodiments in regard to, for example, combinations with other elements and the like. The embodiments of the present disclosure can be changed without departing from the subject matter described in the attached claims, and can be defined as appropriate according to the form of application thereof.

All examples recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority or inferiority of the disclosure. Although the embodiments of the present disclosure have been described in detail, it should be understood that various changes, substitutions, and alterations could be made hereto without departing from the spirit and scope of the disclosure.

What is claimed is:

1. An evaluation apparatus comprising:
    processor; and
    a memory storing instructions that, when executed by the processor, perform operations comprising:
    reading, from a storage, a simulation parameter of a topography simulator and first range information and second range information that are associated with each other, the simulation parameter of the topography simulator being calculated so that the topography simulator outputs, in response to topography information of an unprocessed substrate being input to the topography simulator, topography information similar to topography information of a processed substrate that is to be obtained by processing the unprocessed substrate under a predetermined processing condition of the substrate processing apparatus, the first range information indicating a topography range that is deemed to be the same as a topography of the unprocessed substrate, and the second range information indicating a topography range that is deemed to be the same as a topography of the processed substrate;
    providing topography information of a new unprocessed substrate and the simulation parameter to the topography simulator to cause the topography simulator to output predict topography information of a new processed substrate that is to be obtained by processing the new unprocessed substrate under the predetermined processing condition;
    outputting a result of comparing the topography information of the new unprocessed substrate with the first range information and a result of comparing the topography information of the new processed substrate with the second range information; and
    determining, based on the comparison result, whether the simulation parameter to the topography simulator is appropriate for use in substrate processing.

2. The evaluation apparatus according to claim 1, wherein the processor is further configured to, in response to detecting that the topography information of the new unprocessed substrate is outside the first range information or detecting that the topography information of the new processed substrate is outside the second range information, determine that the topography information of the new processed substrate is a low-accuracy prediction result.

3. The evaluation apparatus according to claim 1, wherein the processor is further configured to, in response to detecting that the topography information of the new unprocessed substrate is included in the first range information and that the topography information of the new processed substrate is included in the second range information, determine that the topography information of the new processed substrate is a high-accuracy prediction result.

4. The evaluation apparatus according to claim 2, wherein the processor is further configured to perform processing using a plurality of simulation parameters to provide the topography information of the new processed substrate to the topography simulator, and operate the topography simulator a plurality of times to output predict topography information of a finally-processed new substrate that is to be obtained by processing the new unprocessed substrate under a plurality of processing conditions of the substrate processing apparatus.

5. The evaluation apparatus according to claim 4, wherein the processor is further configured to output a result of comparing the predicted topography information of the new processed substrate of an n-th time, where n is an integer of one or more, with the second range information associated with an n-th simulation parameter, and output a result of comparing the predicted topography information of the new processed substrate of the n-th time with the first range information associated with an (n+1)-th simulation parameter.

6. The evaluation apparatus according to claim 5, wherein the processor is further configured to, in response to detecting, as a result of comparing the topography information with the first and second range information the plurality of times, that the topography information is outside the range identified by the first range information or is outside the range identified by the second range information in any of the plurality of times, determine that the topography information of the finally-processed new substrate is a low-accuracy prediction result.

7. The evaluation apparatus according to claim 5, wherein the processor is further configured to, in response to detecting, as a result of comparing the topography information with the first and second range information the plurality of times, that the topography information is included in the range identified by the first range information and is included in the range identified by the second range information in all of the plurality of times of comparisons, determine that the topography information of the finally-processed new substrate is a high-accuracy prediction result.

8. The evaluation apparatus according to claim 5, wherein the processor is further configured to generate a plurality of combinations of simulation parameters, wherein where the processor searches the plurality of combinations of simulation parameters by repeating processing of providing the plurality of combinations of simulation parameters to the topography simulator, the processor is further configured to, in response to detecting that the topography information of the new processed substrate of the n-th time is outside the first range information associated with the (n+1)-th simulation parameter of an m-th combination, where m is an integer equal to or more than one, make it less likely that the simulation parameter of an (n+1)-th time is included in an (m+1)-th combination when the (m+1)-th combination is generated.

9. The evaluation apparatus according to claim 8, wherein the (m+1)-th combination is generated using a genetic algorithm.

10. The evaluation apparatus according to claim 8, wherein the processor is further configured to impose a penalty on the simulation parameter of the (n+1)-th time to make it less likely that the simulation parameter of the (n+1)-th time is included in the (m+1)-th combination when the (m+1)-th combination is generated.

11. An evaluation method comprising:

reading, from a storage, a simulation parameter of a topography simulator and first range information and second range information that are associated with each other, the simulation parameter of the topography simulator being calculated so that the topography simulator outputs, in response to topography information of an unprocessed substrate being input to the topography simulator, topography information similar to topography information of a processed substrate that is to be obtained by processing the unprocessed substrate under a predetermined processing condition of the substrate processing apparatus, the first range information indicating a topography range that is deemed to be the same as a topography of the unprocessed substrate, and the second range information indicating a topography range that is deemed to be the same as a topography of the processed substrate;

providing topography information of a new unprocessed substrate and the simulation parameter to the topography simulator to cause the topography simulator to output predict topography information of a new processed substrate that is to be obtained by processing the new unprocessed substrate under the predetermined processing condition;

outputting a result of comparing the topography information of the new unprocessed substrate with the first range information and a result of comparing the topography information of the new processed substrate with the second range information; and determining, based on the comparison result, whether the simulation parameter to the topography simulator is appropriate for use in substrate processing.

12. A non-transitory computer-readable recording medium storing a program including instructions that when executed by a processor of an evaluation apparatus cause the processor to perform operations comprising:

reading, from a storage, a simulation parameter of a topography simulator and first range information and second range information that are associated with each other, the simulation parameter of the topography simulator being calculated so that the topography simulator outputs, in response to topography information of an unprocessed substrate being input to the topography simulator, topography information similar to topography information of a processed substrate that is to be obtained by processing the unprocessed substrate under a predetermined processing condition of the substrate processing apparatus, the first range information indicating a topography range that is deemed to be the same as a topography of the unprocessed substrate, and the second range information indicating a topography range that is deemed to be the same as a topography of the processed substrate;

providing topography information of a new unprocessed substrate and the simulation parameter to the topography simulator to cause the topography simulator to output predict topography information of a new processed substrate that is to be obtained by processing the new unprocessed substrate under the predetermined processing condition;

outputting a result of comparing the topography information of the new unprocessed substrate with the first range information and a result of comparing the topography information of the new processed substrate with the second range information; and determining, based on the comparison result, whether the simulation parameter to the topography simulator is appropriate for use in substrate processing.

\* \* \* \* \*